US011430285B2

(12) United States Patent
Russ et al.

(10) Patent No.: US 11,430,285 B2
(45) Date of Patent: Aug. 30, 2022

(54) ELECTRONIC GAMING MACHINE PROVIDING UNLOCKABLE HARDWARE FUNCTIONALITY

(71) Applicant: IGT, Las Vegas, NV (US)

(72) Inventors: Michael Russ, Graz (AT); Sven Aurich, Schwanberg (AT); Lukas Angermayer, Graz (AT); Thomas Trenkler, Thal (AT)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 17/221,007

(22) Filed: Apr. 2, 2021

(65) Prior Publication Data

US 2021/0319663 A1 Oct. 14, 2021

Related U.S. Application Data

(60) Provisional application No. 63/008,395, filed on Apr. 10, 2020.

(51) Int. Cl.
*G07F 17/32* (2006.01)
*A63F 13/00* (2014.01)

(52) U.S. Cl.
CPC ...... *G07F 17/3209* (2013.01); *G07F 17/3223* (2013.01); *G07F 17/3255* (2013.01); *G07F 17/3262* (2013.01); *G07F 17/3225* (2013.01); *G07F 17/3232* (2013.01)

(58) Field of Classification Search
CPC ............. G07F 17/3209; G07F 17/3223; G07F 17/3225; G07F 17/3232; G07F 17/3255; G07F 17/3262; A63F 13/2145; A63F 13/42; A63F 13/533; A63F 13/69; A63F 13/87
See application file for complete search history.

(56) References Cited

U.S. PATENT DOCUMENTS

| | | | | |
|---|---|---|---|---|
| 8,147,334 | B2 | 4/2012 | Gatto et al. | |
| 8,747,225 | B2 | 6/2014 | Canterbury et al. | |
| 8,764,566 | B2 | 7/2014 | Miltenberger et al. | |
| 8,858,343 | B2 | 10/2014 | Filipour et al. | |
| 11,007,435 | B2 * | 5/2021 | Wang | A63F 13/533 |
| 11,202,959 | B2 * | 12/2021 | Hayashi | A63F 13/533 |
| 2009/0187125 | A1 | 7/2009 | Tran et al. | |

(Continued)

FOREIGN PATENT DOCUMENTS

JP 2007-020624 2/2007

*Primary Examiner* — Milap Shah
(74) *Attorney, Agent, or Firm* — Sheridan Ross P.C.

(57) ABSTRACT

The present disclosure relates generally to systems and methods for unlocking hardware and associated functionality of gaming devices. Before a player reaches a predetermined progress level, enhanced user interface devices of the gaming device remain locked to the player. The functionality associated with the enhanced user interface devices also remains unavailable to the player while the enhanced user interface devices are locked. Once the player reaches the progress level, a hardware-unlock option is presented to the player allowing the player to unlock an enhanced user interface device and select a functionality associated with the unlocked enhanced user interface device. The availability of the hardware-unlock options and specific functionality to be activated can be limited based on in-game events and a progress level reached by the player.

16 Claims, 11 Drawing Sheets

(56) References Cited

U.S. PATENT DOCUMENTS

| | | | | |
|---|---|---|---|---|
| 2010/0274902 | A1* | 10/2010 | Penman | A63F 13/28<br>709/227 |
| 2012/0047368 | A1* | 2/2012 | Chinn | G06F 21/57<br>726/19 |
| 2013/0225268 | A1* | 8/2013 | Caputo | G07F 17/3237<br>463/25 |
| 2014/0121008 | A1* | 5/2014 | Canessa | A63H 3/36<br>463/29 |
| 2015/0012344 | A1* | 1/2015 | Guinn | G06Q 30/0209<br>705/14.12 |
| 2017/0323524 | A1* | 11/2017 | Washington | G07F 17/3209 |
| 2018/0114398 | A1* | 4/2018 | Cho | G07F 17/3255 |

* cited by examiner

ELECTRONIC GAMING MACHINE PROVIDING UNLOCKABLE HARDWARE FUNCTIONALITY

CROSS REFERENCE TO RELATED APPLICATION

The present application claims priority to U.S. Provisional Application No. 63/008,395, filed Apr. 10, 2020, the entire disclosure of which is hereby incorporated by reference.

BACKGROUND

The present disclosure is generally directed to gaming machines and, in particular, toward gaming machines that enable enhanced functionality based on unlocking associated hardware.

Gaming machines utilize a combination of user interfaces, lights, speakers, and effects that engage players and enhance interactive experiences. Any type of game play functionality that presents the players with additional opportunities to win or experience a game is viewed as desirable and can lead to increased play of the gaming machine.

BRIEF SUMMARY

In certain embodiments, the present disclosure relates to devices, methods, and systems providing unlockable hardware that enables enhanced functionality for players of the gaming machine. In some embodiments, a gaming device is provided, comprising: interface hardware comprising a basic user interface device available to a player while playing a game and an enhanced user interface device that is unavailable to the player while playing the game until unlocked; a processor coupled to the interface hardware; and a memory coupled with and readable by the processor and storing therein instructions that, when executed by the processor, cause the processor to: determine a progress level reached by the player while playing the game using the basic user interface device; determine, based on the progress level reached, that a hardware-unlock option is available for the player while playing the game; and activate, based on determining that the hardware-unlock option is available, the enhanced user interface device unlocking a functionality associated with the enhanced user interface device that is absent from the basic user interface device.

In some embodiments, a method is provided, comprising: determining, by a processor of a gaming device, that a player is using a basic user interface device while playing a game on the gaming device; determining, by the processor, a progress level reached by the player while playing the game on the gaming device; determining, by the processor based on the progress level reached, that a hardware-unlock option is available for the player while playing the game on the gaming device; and activating, by the processor based on determining that the hardware-unlock option is available, an enhanced user interface device previously unavailable to the player prior to reaching the progress level unlocking a functionality associated with the enhanced user interface device that is absent from the basic user interface device.

In some embodiments, a gaming machine is provided, comprising: a first user interface device available to a player while playing a game on the gaming machine; a second user interface device that is unavailable to the player until a first gaming progress level is reached by the player playing the game on the gaming machine; a third user interface device that is unavailable to the player until a second gaming progress level is reached by the player playing the game on the gaming machine; a display device; a processor coupled to the first user interface device, the second user interface device, the third user interface device, and the display device; and a memory coupled with and readable by the processor and storing therein instructions that, when executed by the processor, cause the processor to: determine, when the first gaming progress level is reached by the player playing the game on the gaming machine, that the second user interface device is available to unlock; render, by the display device in response to determining that the second user interface device is available to unlock, a first player-selectable option to activate the second user interface device; receive a first input from the player selecting the first player-selectable option; activate, based on the first input received from the player, the second user interface device unlocking a functionality associated with the second user interface device that is absent from the first user interface device; determine, when the second gaming progress level is reached by the player playing the game on the gaming machine, that the third user interface device is available to unlock; render, by the display device in response to determining that the third user interface device is available to unlock, a second player-selectable option to activate the third user interface device; receive a second input from the player selecting the second player-selectable option; and activate, based on the second input received from the player, the third user interface device unlocking a functionality associated with the third user interface device that is absent from the first user interface device and the second user interface device.

Additional features and advantages are described herein and will be apparent from the following Description and the figures.

DETAILED DESCRIPTION

Figure 1:
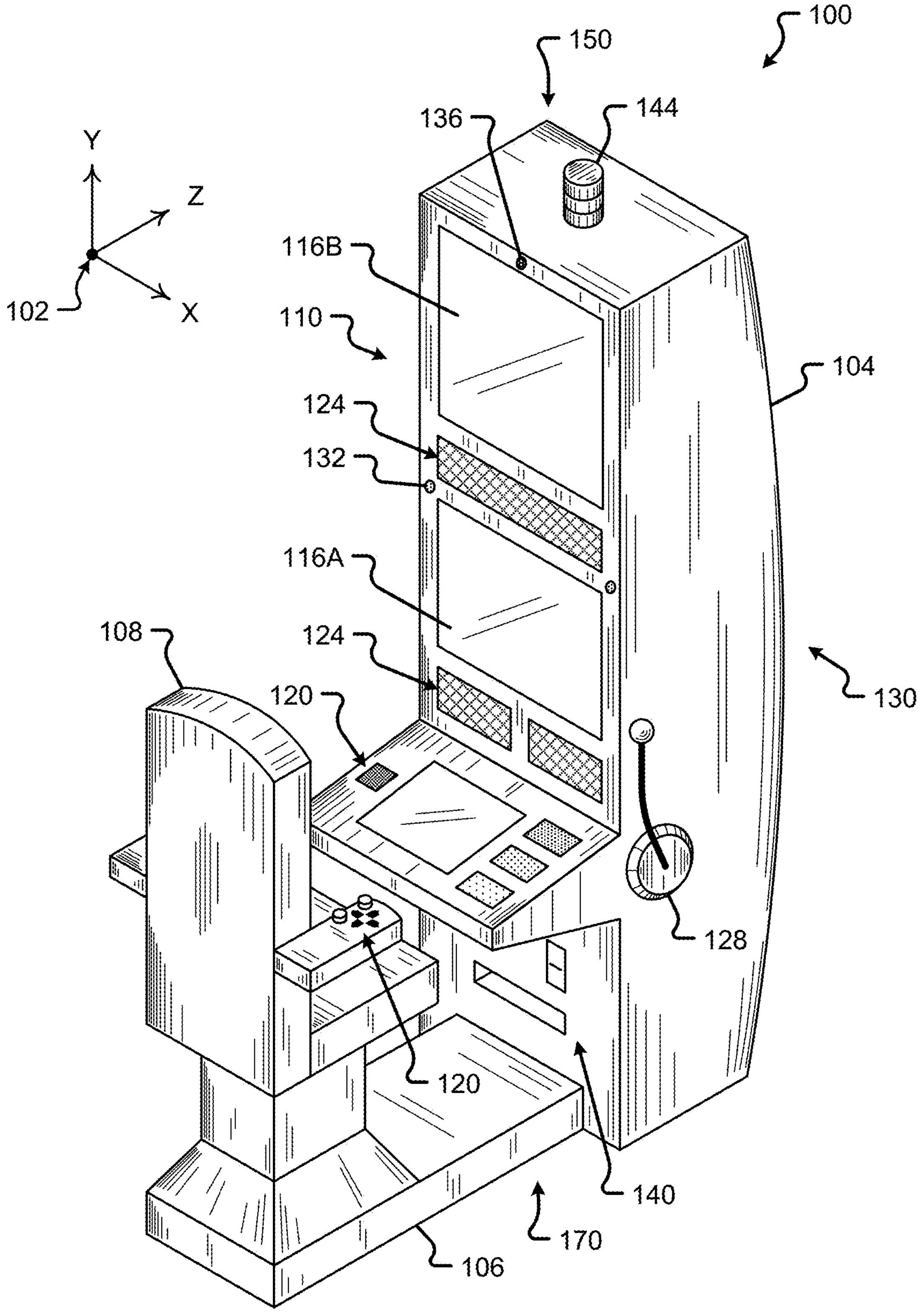
FIG. 1 is a perspective view of an illustrative gaming device comprising hardware that is selectively unlockable based on progress levels of players.

Embodiments of the present disclosure will be described in connection with gaming devices comprising unlockable hardware and associated functionality. The hardware of a gaming device may be selectively unlocked based on a progress level of a player. The progress level may correspond to a level reached in a game, an amount of experience points earned in one or more games, a paid-for functionality associated with a game, and/or the like. The gaming devices may comprise a computational device, such as an Electronic Gaming Machine (EGM), that is capable of locking and unlocking hardware and associated functionality for a player. While embodiments of the present disclosure will be described in connection with the example of an EGM activating game play functionality and features based on available hardware unlock options (e.g., enhanced user interfaces, interactive elements, etc.), it should be appreciated that embodiments of the present disclosure are not so limited. For instance, other types of computational devices, such as portable user devices, smartphones, tablets, laptops, Personal Computers (PCs), wearable devices, etc. may be used to activate and/or implement the game play functionality as part of a game as described herein. Furthermore, it should be appreciated that embodiments of the present disclosure may apply to any type, or aspect, of a game such as bingo, keno, slots, video poker, table games, scrolling games, arcade games, etc.

To date, on casino floors and throughout gaming venues, there are countless different EGMs comprising different hardware functionalities and technologies, such as three-dimensional (3D) displays, gesture input, touch input, eye tracking, biometric identification, premium chairs with rumble and audio, wired or wireless connection technologies to mobile devices, and many more. Mostly, those functionalities are considered to be attractive to the player or aim to simplify the interaction with the EGMs in order to increase a player's gaming experience and their time on a particular device. To date, these functionalities are "static" in nature, in that they are either turned on or off, and remain in the same state or behavior over time, independent from the game. Also, the availability and scope of functionality is not at all related to game progress (e.g., progress levels, etc.) made in a game.

In some embodiments, the present disclosure describes relating an availability of hardware functionalities to in-game events and game progress. These functionalities can be enhanced or evolved over time (e.g., by increasing experience, reaching new progress levels, etc., and/or combinations thereof). Also, different "sets" or "levels" of hardware functionalities can be locked or unlocked based on at least one of progress levels reached by players, prior hardware-unlock options selected by players, etc. By offering these types of situational availabilities, the present disclosure provides methods that both make players curious about further functionalities available over time and provide the players with an opportunity to configure their game with their preferred set of functionalities. Ultimately, player immersion increases, and players spend longer time at a gaming device, or machine.

The hardware unlocks available and associated functionality may be related to game events and/or game progress. In some embodiments, hardware components (e.g., devices, elements, systems, etc.) may be partially or fully locked and/or unlocked based on the game events and/or game progress. Additionally or alternatively, the functionality provided by hardware unlocks may be extendable based on game events and/or game progress. For instance, after a hardware unlock option is selected by a player, the unlock and the functionality associated with the unlock may be extended based on a "retrigger" progress level.

In some cases, a player may pay (e.g., a one-time or recurring fee, etc.) in order to use various hardware unlocks and associated functionality for a gaming device. In one embodiment, the availability of hardware unlocks and associated functionality may be at least one of permanent after unlocking, time-limited, games played limited, limited for a certain feature, etc., and/or combinations thereof.

The players of a gaming device may be able to control a number of features associated with unlocking hardware and associated functionality. For example, a player may be able to configure available hardware functionality based on the player's preferences. As described herein, a game may comprise a hardware functionality settings or "customization" menu in which the players can configure their own settings. In some embodiments, a player may be able to save their configured hardware functionality and settings to a player account associated with the player (e.g., via a tracking card, login information, biometric information, or other methods of uniquely identifying one player from another). These settings (e.g., saved settings, progress level status, identification of unlocked hardware, etc.) may be saved to a player account that is stored on a gaming device, in a server separate from the gaming device, in a mobile device associated with the player, on a game or tracking card, and/or combinations thereof. As can be appreciated, this saving of settings may allow a player to restore previously configured and/or earned hardware unlocks and functionality at another gaming device (e.g., upon registration and/or identification, etc.). The settings may be retrieved by the gaming device accessing information stored on a game card of the player, accessing information stored in a player profile database, in a computer readable medium of the gaming device, or other memory location in a computer readable medium associated with a server that is separate from the gaming device, etc. In one embodiment, the settings may be transferred from one gaming device to another gaming device in a gaming venue (e.g., a casino, etc.).

Players may be eligible to enter a certain game feature only when a required hardware unlock functionality is available. By way of example, prior to unlocking a gesture-detection functionality associated with unlocking gesture-detection sensors of the gaming device, a player may not be allowed to interact with the game using gestures. This lack of gesture-based interaction would prevent the player from being able to enter a gesture-based bonus feature of the game. Continuing this example, when the gesture-detection functionality is available, the player may be presented with the opportunity to enter the gesture-based bonus feature of the game. For instance, the player may use gestures to collect coins using their own hands rather than a touchscreen or human machine interface device, etc.

The functionality enabled by the hardware unlocks may provide game features where the availability of certain hardware functionalities might give better win chances (e.g., probabilities, etc.) or playing conditions to the player. Stated another way, the player may have more functionality unlocked to allow them to win bigger (increasing the chances associated with a player winning a portion of a game). These hardware unlock options and associated functionalities may be enabled in order to reward the player for spending a certain amount of time at a gaming device. Among other things, these features and capabilities are not available, nor are they conceived, in the current "static" hardware functionality offerings associated with conventional gaming machines.

In some embodiments, the present disclosure describes a number of hardware technologies and/or devices. These hardware technologies and/or devices may be referred to herein as "user interface hardware." Such user interface hardware and functionality may include, but are in no way limited to, smart devices (e.g., cameras, sensors, etc.), chair massage functionality, gesture control, gaze control, 3D screen functionality, directional, spatial and/or ultrasound audio, haptic touch feedback, haptic feedback in mid-air, ticket payout vs. coin payout, arm rest control buttons, pressure-sensitive input, input using a chair's position sensors, etc. Other functionality of gaming device hardware associated with display and/or audio enhancements may also be unlocked for a player. Display enhancements may allow displays to move from rendering two-dimensional (2D) content to rendering 3D content, visualized, for example, via a 3D video processor. Audio enhancements may allow a gaming device to provide directional, private, and/or targeted audio output that is directed toward a player. This enhanced audio output may be provided in addition to, or separately from, providing regular audio output. In some embodiments, the audio enhancements may be provided by separate audio speakers. In one embodiment, activating the functionality associated with these hardware unlocks may offer a player added monetary value by, for example, allowing the player enhanced user interface options to increase chances of winning, etc. The functionality, required to offer the additional monetary value, may be unlocked only after the player has spent certain time at a gaming device. Among other things, this progress-level based hardware-unlock behavior rewards a player for spending a longer amount of time on a gaming device. A value add to the player through unlocked technology (e.g., performing a hand gesture in mid-air instead of touching the screen at a certain position, etc.) does not necessarily mean skill gaming. Rather, the use of one or more hand gestures instead of touching a screen might be beneficial itself already, without having a skill component.

The hardware and associated functionality may be unlocked via purchase, through progress levels reached, and/or extended. In one embodiment, a player may pay to unlock hardware and associated functionality in order to gain an advantage in a feature or aspect of a game. The player may either pay upfront (e.g., if the feature gets triggered, the player will have the hardware unlock available, etc.), pay when entering the feature (e.g., the player may be presented with an option to pay X amount to get an advantage, etc.), and/or pay a service fee (e.g., monthly, annually, etc.) to always have a certain functionality associated with a hardware unlock enabled.

In one embodiment, the hardware and associated functionality may be unlocked based on a progress level reached by a player. The progress level may correspond to a game event including, but in no way limited to, a triggering event (e.g., an appearance of an unlock hardware game symbol in a game, etc.), reaching a specific level in a game, a mystery triggering event (e.g., a randomly-generated option to unlock hardware etc.), and/or automatically after reaching a predetermined game event (e.g., playing a certain number of games, collecting a certain number of experience points, etc.), etc., and/or combinations thereof.

The hardware unlocks and associated functionality may be extended after, or prior to, the hardware unlock availability expiring. In this manner, a player may extend the availability and/or activation of the hardware unlocks and associated functionality. The extension may be triggered via a re-trigger symbol (e.g., "extend hardware unlock for another amount of time or certain number of games" via symbol, etc.). A player may pay to extend the availability and/or activation of the hardware unlocks and associated functionality. For example, the player may be presented with an option (e.g., rendered to a display of the gaming device, etc.) stating "hardware unlock availability has expired—pay X amount to extend or to unlock permanently." In some embodiments, this feature may be used to allow a player access to a free demonstration of the unlocked hardware and associated functionality and then extend the unlock by paying, etc.

Some specific hardware unlocks and associated functionality described herein may be permanent, time-limited, game-limited, and/or require some prerequisite hardware feature to be unlocked. Permanent unlocks may correspond to hardware unlocks and associated functionality that, once unlocked, remain unlocked to the player (e.g., either for a current gaming session, or permanently, saved to player account, etc.). Time-limited unlocks may correspond to hardware unlocks and associated functionality that, once unlocked, are available for a limited amount of time (e.g., 10 seconds, 10 minutes, 1 hour, etc.). Game-limited unlocks may correspond to hardware unlocks and associated functionality that, once unlocked, are available only for a predetermined number of games played by the player. Prerequisite hardware feature unlocks may correspond to hardware unlocks and associated functionality that can only be unlocked when a progress level is reached, an achievement is earned, and/or one or more other hardware unlocks have been made by a player.

Among other things, embodiments of the present disclosure provide a player with additional ways to experience a game at a gaming device, encourage players to continue playing a game at a gaming device, and allow a player more control over the game-playing experience and interaction with a gaming device by providing unlockable hardware and associated functionality that is not possible with a conventional gaming device.

The terms "gaming device," "gaming machine," and "EGM" as used herein may refer to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, an arcade game, etc.

With reference initially to FIG. 1, details of an illustrative gaming device comprising hardware that is selectively unlockable based on progress levels of players will be described in accordance with at least some embodiments of the present disclosure. The gaming device 100 may comprise a cabinet 104, a chair 108, and a bridge 106 connecting the cabinet 104 with the chair 108. In some embodiments, one or more electrical connections may run from components disposed in the cabinet 104 to the chair 108, and vice versa, via the bridge 106. In one embodiment, the bridge 106 may comprise a box structure or chamber comprising wireway, conduit, and/or other interconnections of the gaming device 100. In some embodiments, the bridge 106 may be formed from a portion of the cabinet 104 and/or the chair 108.

In some embodiments, reference may be made to dimensions, angles, directions, relative positions, and/or movements associated with one or more components of the gaming device 100 with respect to a coordinate system 102. The coordinate system 102, as shown in FIG. 1, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the gaming device 100. These planes may be disposed orthogonal, or at 90 degrees, to one another. While the origin of the coordinate system 102 may be placed at any point on or near the gaming device 100 for the purposes of description, the axes of the coordinate system 102 are always disposed along the same directions from figure to figure. As shown in FIG. 1, the width of the gaming device 100 may be defined as a dimension along the X-axis (e.g., measured from the left-hand side 110 of the gaming device 100 to the right-hand side 130 of the gaming device 100), the height of the gaming device 100 may be defined as a dimension along the Y-axis (e.g., measured from the top 150 of the gaming device 100 to the bottom 170 of the gaming device 100), and the depth of the gaming device 100 may be defined as a dimension along the Z-axis (e.g., measured from the chair 108 to a rear of the cabinet 104, etc.). Other dimensions, angles, and relative positions of the one or more components of the gaming device 100 may be as described herein.

A gaming device 100 may correspond to a type of device that enables player interaction in connection with playing games (e.g., games of chance, arcade games, games of skill, etc.), selecting hardware unlock options, and activating functionality associate with one or more hardware-unlock options. For instance, the gaming device 100 may correspond to a type of device that enables a player to interact via a display device (e.g., display screens 116A, 116B, etc.), user interface devices 120, lever(s) 128, and/or other devices and hardware. A gaming device 100 may include any type of known gaming device such as a slot machine, a table game, an electronic table game (e.g., video poker), a skill-based game, an arcade game, etc. The gaming device 100 can be in the form of an EGM, virtual gaming machine, video game gambling machine, etc. One particular type of gaming device 100 may include mobile devices such as portable communications devices, personal computers, and/or other microprocessor-enabled devices having memory and communications interfaces. Non-limiting examples of a mobile device include a cellular phone, a smartphone, a tablet, a wearable device, an augmented reality headset, a virtual reality headset, a laptop, a PC, or the like. In addition to playing games on a gaming device 100, players may also be able to unlock a mobile device as a user interface device for the gaming device 100.

In some embodiments, the gaming device 100 may comprise one or more display screens 116A, 116B. The display screens 116A, 116B may correspond to a liquid crystal display (LCD), light emitting diode (LED) display, organic LED display, active-matrix organic LED display, touchscreen display, and/or any other display device capable of rendering images to a screen portion of the display screens 116A, 116B. Although shown in the form of a substantially rectangular shape, it should be appreciated that the display may be of any shape including, but in no way limited to, a square, circle, ovoid, triangle, polygon, etc., and/or combinations thereof. In some embodiments, the display screens 116A, 116B may comprise a number of pixels that substantially fill an area of the display screens 116A, 116B. Among other things, the display screens 116A, 116B may render game information to a player of the gaming device 100.

The gaming device 100 may comprise one or more user interface devices 120 disposed on, or in, a portion of the cabinet 104 (e.g., touchscreens, buttons, keyboards, etc.), the chair 108 (e.g., joysticks, buttons, switches, directional pads, etc.), and/or the bridge 106 (e.g., foot pedals, etc.). A player of the gaming device 100 may interact with the gaming device 100 via one or more of the user interface devices 120 as described herein.

In some embodiments, the gaming device 100 may include one or more speakers 124 disposed in, or on, a front of the cabinet 104 (e.g., facing the chair 108) and/or in a portion of the chair 108. The speakers 124 may provide an audio output of the gaming device 100 in monaural form and/or stereophonic sound. In one embodiment, the speakers 124 may produce an audio output to a player sitting in the chair 108 of the gaming device 100. The audio output may be focused on the player sitting in the chair 108 such that no other position around the gaming device 100 can detect the audio output produced by the speakers 124. This focused audio output may be referred to herein as spatial, or directional, audio output. The speakers 124 may comprise at least one electroacoustic transducer, tactile sound transducer, electrostatic speaker, dynamic loudspeaker, moving-coil loudspeaker, subwoofer, or other speaker.

Another user interface device may comprise one or more lever(s) 128. The lever(s) 128 may correspond to a pivotable lever associated with a "one-armed bandit" slot machine. In one embodiment, a player may pull the lever 128, causing the lever 128 to rotate about the X-axis of the coordinate system 102, and providing a gaming input to the gaming device 100. In some embodiments, the gaming input may direct the gaming device 100 to initiate a game, spin reels associated with a game, and/or the like.

In some embodiments, the gaming device 100 may comprise one or more image sensors 132 disposed on, or about, the cabinet 104. The image sensors 132 may include, but are in no way limited to, a light source (e.g., infrared (IR) light source, etc.), camera, photosensor, processor, and/or the like. The image sensors 132 may determine gestures made in proximity to the gaming device 100 by, for example, emitting IR light from the front of the cabinet 104 in a direction toward the chair 108. The IR light may illuminate an object (e.g., a player, etc.) disposed between the chair 108 and the cabinet 104. A photosensor of the image sensors 132 may measure, via a number of pixels disposed thereon, a distance the IR light has traveled from the IR light source to the object defining a depth of features associated the object (e.g., hands, head, body parts, etc. of a player). This spatial information of the player may be determined in real time, via the processor, and mapped to gestures stored for player actions in a memory of the gaming device 100. Among other things, the image sensors 132 alone, or in combination with other user interface hardware of the gaming device 100, may determine and interpret gestures, movements, and/or other information associated with a player at the gaming device 100.

The gaming device 100 may include at least one camera 136, or image capture device, that is configured to capture still and/or video images in proximity to the gaming device 100. The camera 136 may include, or be associated, with additional devices, such as light sources, flashes, IR emitters, etc., to provide a clear image capture environment in proximity to the gaming device 100. The camera 136 may comprise multiple cameras configured to record stereo images of objects, such as players, in proximity to the gaming device 100. As provided herein the camera 136 may be controlled by the processor 204 in conjunction with signals from the game instruction set 220, the hardware-unlock instruction set 228, and/or other instruction sets in the memory 208 (e.g., shown and described in conjunction with FIG. 2). The camera 136 may be used in conjunction with the image sensors 132 and/or any other device of the gaming device 100 to identify a player, determine movements, detect gestures, and/or interpret other player input for the gaming device 100.

In some embodiments, the gaming device 100 may comprise one or more payout devices 140. The payout devices 140 may include a physical coin payout mechanism that releases or distributes a predetermined number of coins from a secure area of the cabinet 104 into a coin tray, or other receptacle, disposed outside of the secure area of the cabinet 104 when a player wins an amount of money via the gaming device 100. The player may collect the coins by accessing the coin tray (e.g., disposed on the front of the cabinet 104). The physical coin payout mechanism may operate and issue cash, coins, tokens, or chips based on an amount indicated within the credit meter of the player. In some embodiments, the physical coin payout mechanism may include counting hardware configured to count and distribute an appropriate amount of coins, or tokens, based on a player's winnings or available credit within the credit meter (e.g., credit meter 224 described in conjunction with FIG. 2). In one embodiment, the payout devices 140 may include a ticket issuance device that is configured to print or provide physical tickets/vouchers to players. In some embodiments, the ticket issuance device may be configured to issue a ticket/voucher consistent with an amount of credit available to a player, possibly as indicated within a credit meter for the player.

The gaming device 100 may comprise a status-indication light stack 144 disposed on a top 150 of the cabinet 104 and/or other portion of the gaming device 100. The status-indication light stack 144 may illuminate one or more colors indicating that a player has won a game of the gaming device 100. In some embodiments, the status-indication light stack 144 may serve to indicate a status of the gaming device 100. For instance, the status-indication light stack 144 may illuminate a first color output to indicate the gaming device 100 is in an operational state, a second color output to indicate the gaming device 100 is in a fault (e.g., error detected, etc.) state, and a third color output to indicate the gaming device 100 is nonfunctional (e.g., not operational). In one embodiment, the status-indication light stack 144 may comprise one or more lights stacked on top of one another. In addition to a color output of the one or more lights of the status-indication light stack 144, the light output may be configured to animate by blinking, flashing, remaining on, remaining off, and/or various combinations thereof. Similar to the color output, this animation may provide enhanced information about a state of the gaming device 100 and/or a game played on the gaming device 100.

Figure 2:
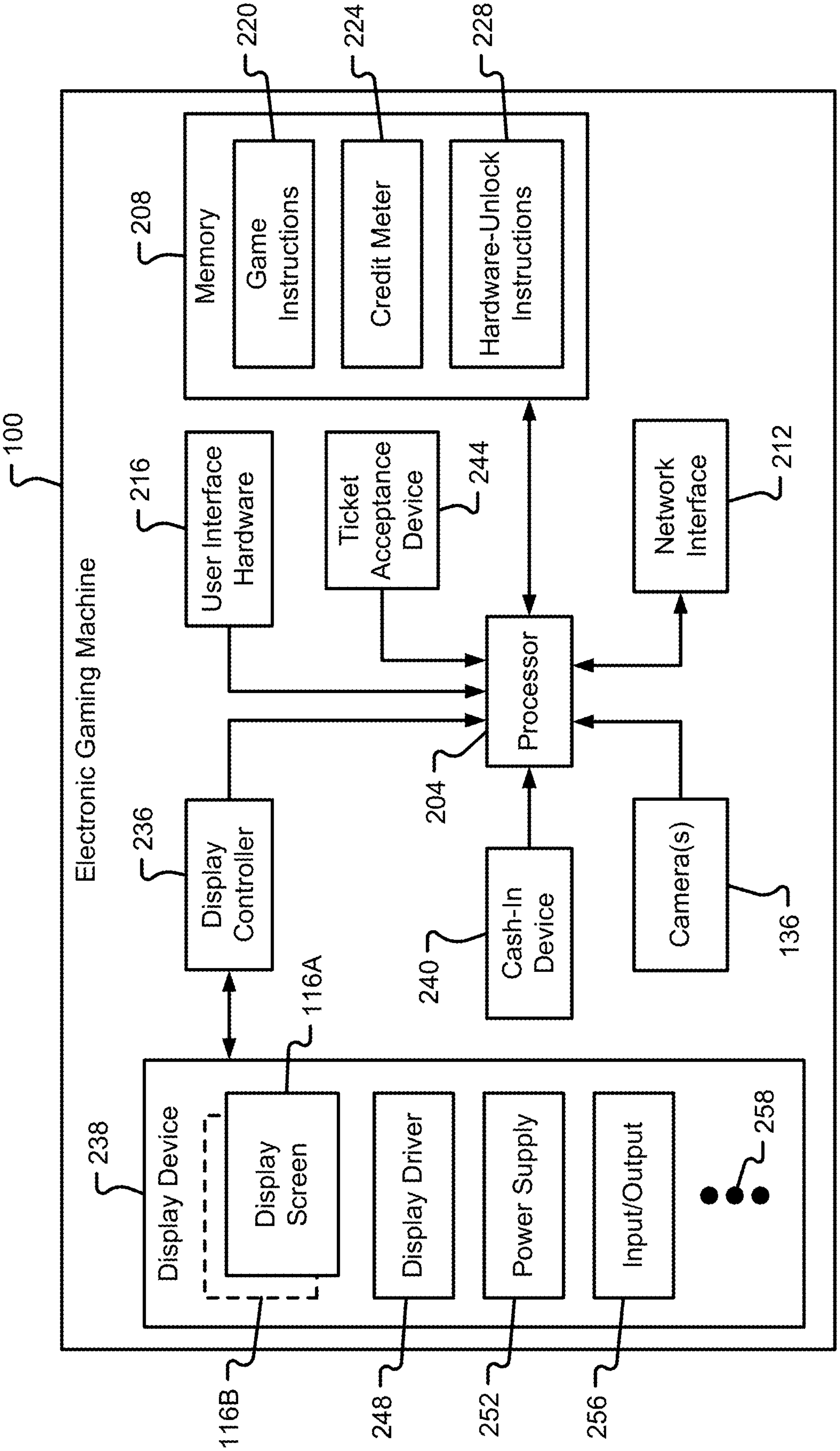
FIG. 2 is a block diagram depicting an illustrative gaming device that selectively unlocks hardware based on the progress level of a player.

With reference now to FIG. 2, additional details of a gaming device 100 will be described in accordance with at least some embodiments of the present disclosure. The gaming device 100 is depicted to include a processor 204, memory 208, a network interface 212, user interface hardware 216, a display controller 236, a display device 238, a cash-in device 240, a ticket acceptance device 244, and one or more cameras 136.

In some embodiments, the processor 204 may correspond to one or many computer processing devices. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microprocessor, Central Processing Unit (CPU), or plurality of microprocessors that are configured to execute the instructions sets stored in memory 208. Upon executing the instruction sets stored in memory 208, the processor 204 enables various player authentication, game management functions, and hardware unlocking functionality of the gaming device 100.

The memory 208 may include any type of computer memory device or collection of computer memory devices. Non-limiting examples of memory 208 include Random Access Memory (RAM), Read Only Memory (ROM), flash memory, Electronically-Erasable Programmable ROM (EEPROM), Dynamic RAM (DRAM), etc. The memory 208 may be configured to store the instruction sets depicted in addition to temporarily storing data for the processor 204 to execute various types of routines or functions. Although not depicted, the memory 208 may include instructions that enable the processor 204 to store data into a player profile database and retrieve information from the database. Additionally or alternatively, the player profile database or data stored therein may be stored internal to the gaming device 100 (e.g., within the memory 208 of the gaming device 100 rather than in a separate database) or in a separate server.

The memory 208 may store various data and instruction sets that allow the gaming device 100 to manage the hardware-unlock options available to a player, alter game behavior to include the functionality associated with the hardware-unlock options, and render the presentation of offers to activate functionality associated with a hardware-unlock option. Examples of instruction sets and information that may be stored in the memory 208 include player information, a game instruction set 220, a credit meter 224, a hardware-unlock instruction set 228, and/or other instruction sets.

In some embodiments, the game instructions 220, when executed by the processor 204, may enable the gaming device 100 to facilitate one or more games of chance or skill and produce interactions between the player and the game of chance or skill. In some embodiments, the game instructions 220 may include subroutines that present one or more graphics to the player via the display device 238 and/or one or more devices of the user interface hardware 216, subroutines that calculate whether a particular game wager has resulted in a win or loss during the game of chance or skill, subroutines for determining payouts for the player in the event of a win, subroutines for exchanging communications with a connected server, subroutines for enabling the player to engage in a game using their mobile device, and any other subroutine or set of instructions that facilitate gameplay at or in association with the gaming device 100.

The credit meter 224 may correspond to a data structure within the gaming device 100 that facilitates a tracking of activity at the gaming device 100. In some embodiments, the credit meter 224 may be used to store or log information related to various player activities and events that occur at the gaming device 100. The types of information that may be maintained in the credit meter 224 include, without limitation, player information, available credit information, wager amount information, and other types of information that may or may not need to be recorded for purposes of accounting for wagers placed at the gaming device 100 and payouts made for a player during a game of chance or skill played at the gaming device 100. In some embodiments, the credit meter 224 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 100, and the like. In some embodiments, certain portions of the credit meter 224 may be updated in response to outcomes of a game of chance or skill played at the gaming device 100. In some embodiments, the credit meter 224 may be updated depending upon whether the gaming device 100 is issuing a ticket/voucher, being used as a point of redemption for a ticket/voucher, and/or any other activity associated with a ticket/voucher. Some or all of the data within the credit meter 224 may be reported to a server separate from the gaming device 100, for example, if such data applies to a centrally-managed game and/or a status of a ticket/voucher. As an example, the number, value, and timing of wagers placed by a particular player and payouts on such wagers may be reported to a casino server that is separate and apart from the gaming device 100.

The hardware-unlock instruction set 228, when executed by the processor 204, may enable the gaming device 100 to activate functionality associated with one or more hardware-unlock options available to a player. In some embodiments, the hardware-unlock instruction set 228 may determine, based on a progress level of a player, whether hardware-unlock options are available that enable the player to interact with the gaming device 100 using one or more additional user interface devices. In some embodiments, use of the additional user interface devices may include activating a functionality for the player that was not previously available without the hardware-unlock option. The hardware-unlock instruction set 228 may include rules for specific hardware-unlock options as they become available to a player. As described herein, the hardware-unlock instruction set 228 may define specific devices in the user interface hardware 216 that are available to unlock for an amount of time (e.g., permanently, time-based, or game-based, etc.). Additionally or alternatively, the hardware-unlock instruction set 228 may define whether a player can extend an available hardware-unlock option (e.g., via payment, etc.) beyond the amount of time. The hardware-unlock instruction set 228 may alter various display and/or auditory presentations for a game played on the gaming device 100, images rendered via the display device 238 of the gaming device 100, and/or a game behavior for games played by the gaming device 100. In some embodiments, the hardware-unlock instruction set 228 may render one or more alerts, pop-up windows, player-selectable options, interactive windows, alarms, winning graphics, flashing lights, losing graphics, etc. via the display device 238 of the gaming device 100.

The network interface 212 provides the gaming device 100 with the ability to send and receive communication packets or the like over the communication network. The network interface 212 may be provided as a network interface card (NIC), a Slot Machine Interface Board (SMIB), a network port, a modem, drivers for the same, and the like. Communications between the components of the gaming device 100 and other devices connected to the communication network may all flow through the network interface 212. In some embodiments, examples of a suitable network interface 212 include, without limitation, an Ethernet port, a USB port, an RS-232 port, an RS-485 port, a NIC, an antenna, a driver circuit, a modulator/demodulator, etc. The network interface 212 may include one or multiple different network interfaces depending upon whether the gaming device 100 is connecting to a single communication network or multiple different types of communication networks. For instance, the gaming device 100 may be provided with both a wired network interface and a wireless network interface without departing from the scope of the present disclosure. In some embodiments, the network interface 212 may include different communications ports that interconnect with various input/output lines.

The user interface hardware 216 may correspond to any type of input and/or output device, or combination thereof, that enables the player to interact with the gaming device 100. As can be appreciated, the nature of the user interface hardware 216 may depend upon the nature of the gaming device 100. For instance, if the gaming device 100 includes a slot machine game, then the user interface hardware 216 may include one or more reels, or virtually rendered reels, with symbols provided thereon, one or more lights or LED displays, one or more depressible buttons, a lever 128 or "one armed bandit handle," a speaker 124, or combinations thereof. In some embodiments, the user interface hardware 216 may include one or more touch-sensitive displays, LED/LCD display screens, buttons, switches, etc. as described herein. It is an aspect of the present disclosure that one or more devices in the user interface hardware 216 may be selectively locked and/or unlocked via hardware-unlock instruction set 228 executed by the processor 204.

The gaming device 100 may include one or more display devices 238 configured to render information, games, settings windows, hardware information, interactive elements, and/or other visual output to one or more display screens 116A, 116B. The gaming device 100 may include one or more display controllers 236 configured to control an operation of the display device 238. This operation may include the control of input (e.g., player input via one or more device of the user interface hardware 216, command input via the instruction sets in memory 208, combinations thereof, etc.), output (e.g., display, rendered images, visual game behavior, etc.) and/or other functions of the display device 238.

The display device 238 may comprise one or more display screens 116A, 116B that are configured to selectively activate pixels and/or display elements to render one or more games, windows, indicators, interactive elements, icons, characters, lights, images, etc. As provided above, examples of the display screens 116A, 116B may include, but are in no way limited to, an LCD, an LED display, an ELD, an OLED display, and/or some other two-dimensional and/or three-dimensional display. In some embodiments, the one or more display screens 116A, 116B may be separated into a first display screen 116A (e.g., a main display) and a second display screen 116B (e.g., a secondary display). In a gaming device 100 context, the main display may correspond to a display arranged in a first viewing position of a player and the secondary display may correspond to a display arranged in a second (e.g., higher) viewing position of the player, as illustrated in FIG. 1. It is an aspect of the present disclosure that the gaming device 100 may include any number of display screens 116A-116B in any arrangement or orientation (e.g., stacked, side-by-side, staggered, overlapped, angled, and/or combinations thereof). In some embodiments, the display device 238 may be configured to render information in one or more discrete areas (e.g., windows, portions, zones, backgrounds, etc.) of the display screens 116A, 116B or superimposed in an area of the one or more display screens 116A, 116B.

The display device 238 may include a display driver 248, a power supply 252, an input/output 256, and/or other components 258 configured to enable operation of the display device 238. The display driver 248 may receive commands and/or other data provided by the processor 204 and one or more of the instruction sets in memory 208. In response to receiving the commands, the display driver 248 may be configured to generate the driving signals necessary to render the appropriate images to the display screens 116A, 116B. The power supply 252 may provide electric power to the components of the display device 238. In some embodiments, the power supply 252 may include a transformer and/or other electronics that prevent overloading, condition power signals, and/or provide backup power to the display device 238. The input/output 256 may correspond to one or more connections for receiving or exchanging information and/or video from components of the gaming device 100. The input/output 256 may include an interconnection to the network interface 212. For example, the input/output 256 may include a high-definition multimedia interface (HDMI) input, Ethernet, composite video, component video, H.264, or other video connection.

The cash-in device 240 may include a bill acceptor, a coin acceptor, a chip acceptor or reader, or the like. In some embodiments, the cash-in device may also include credit card reader hardware and/or software. In one embodiment, the cash-in device 240 may be a part of the payout devices 140.

Because the gaming device 100 may be used for the acceptance and issuance of tickets/vouchers, the gaming device 100 may be provided with appropriate hardware to facilitate such acceptance and issuance. Specifically, the gaming device 100 may be provided with a ticket acceptance device 244 that is configured to accept or scan physically-printed tickets/vouchers and extract appropriate information therefrom. In some embodiments, the ticket acceptance device 244 may include one or more machine vision devices (e.g., a camera, IR scanner, optical scanner, barcode scanner, etc.), a physical ticket acceptor, a shredder, etc. The ticket acceptance device 244 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's mobile device, for example. In one embodiment, an impersonal player ID may be present on the electronic ticket/voucher as part of the barcode, QR code, or other visible information on the electronic ticket/voucher.

Figure 3:
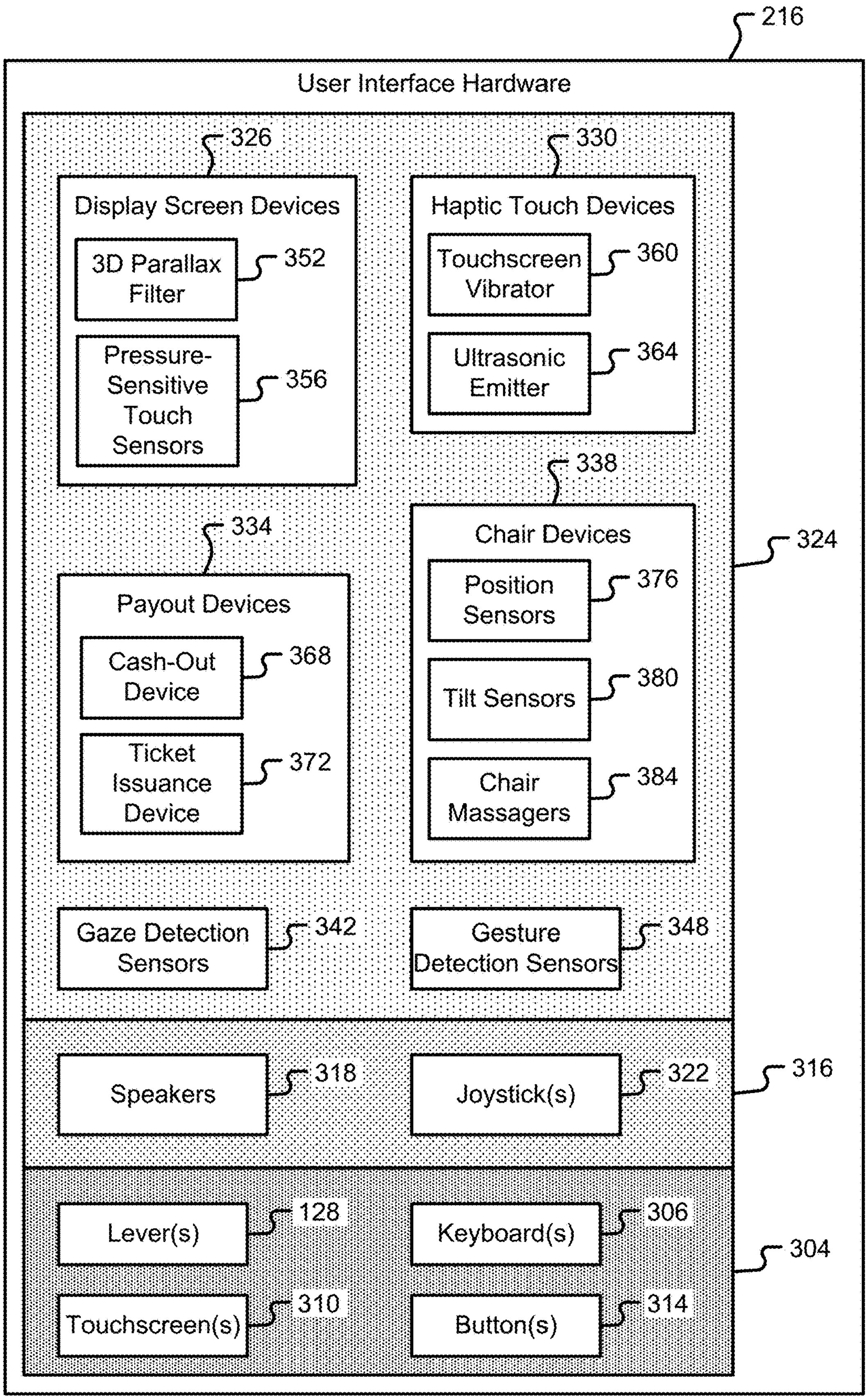
FIG. 3 is a block diagram depicting various user interface hardware of a gaming device that can be activated, locked, and unlocked based on a progress level of a player.

Referring to FIG. 3, a block diagram depicting various user interface hardware 216 of a gaming device 100 that can be activated, locked, and unlocked based on a progress level of a player will be described in accordance with embodiments of the present disclosure. The user interface hardware 216 may comprise a number of basic user interface devices 304, selective enhanced user interface devices 316, and enhanced user interface devices 324. The basic user interface devices 304 may correspond to user interface hardware 216 that are available to a player while playing a game via the gaming device 100. In some embodiments, these basic user interface devices 304 may correspond to a basic set of interface devices that enable a basic interaction between the player and a game on the gaming device 100. These basic user interface devices 304 may always be available (e.g., remaining unlocked) to a player while playing a game. The enhanced user interface devices 324 may include interface devices that are unavailable to a player (e.g., remaining locked) until the player reaches a progress level that unlocks a specific interface device, or combination of devices, in the enhanced user interface devices 324. The selective enhanced user interface devices 316 may include interface devices that, depending on the game of the gaming device 100, may correspond to devices in the basic user interface devices 304 or the enhanced user interface devices 324. For instance, where a gaming device 100 provides an arcade game to a player, the joystick 322 may be considered as one of the basic user interface devices 304 that must always be available to a player while playing the arcade game. On the other hand, where a gaming device 100 only requires a joystick input as part of a bonus game (e.g., upon reaching a particular progress level, etc.), the joystick may be considered as one of the enhanced user interface devices 324. Although the various user interface hardware 216 is shown in particular groupings (e.g., groups 304, 316, 324), it should be appreciated that some devices may be added to a group, removed from a group, or moved between groups without departing from the scope of the present disclosure.

In one embodiment, the basic user interface devices 304 may include, but are in no way limited to, one or more lever(s) 128, keyboard(s) 306, touchscreen(s) 310, and/or button(s) 314. As shown in FIG. 1, these basic user interface devices 304 may correspond to one or more of the user interface devices 120, 128 disposed on or about the cabinet 104 and/or the chair 108 of the gaming device 100. In one embodiment, a player may be able to provide input to the gaming device 100 via one or more keyboards 306. The keyboards 306 may correspond to a physical keyboard or a virtual keyboard displayed by a touchscreen 310. The touchscreen 310 may be a standalone input device or correspond to one or more of the display screens 116A, 116B. The touchscreen 310 may correspond to a touch-sensitive display, LED/LCD display screen, button, switch, and/or the like. In one embodiment, the touchscreen 310 may be arranged separately and apart from the display screens 116A, 116B. The button(s) 314 may correspond to one or more switches that are capable of being actuated in response to receiving physical contact (e.g., pressing, etc.) from a player. The button(s) 314 may correspond to physical switches (e.g., electromechanical devices, etc.) that move in response to physical contact (e.g., by a player) and alter a state of an electrical signal associated with the button(s) 314. In one embodiment, the button(s) 314 may correspond to digital, or rendered, buttons of one or more touchscreen(s) 310. In this example, contact (e.g., capacitive or resistive touch, etc.) with the area to which the button(s) 314 are rendered by the touchscreen(s) 310 may cause an actuation input that is interpreted by the processor 204 as an input from a player of the gaming device 100.

In some embodiments, the selective enhanced user interface devices 316 may include one or more speakers 318 and joystick(s) 322. The speakers 318 may correspond to the speakers 124 described above. In one embodiment, the gaming device 100 may provide sound output by the speakers 318 in a monoaural form when the speakers 318 are part of the basic user interface devices 304 and provide sound output by the speakers 318 in a stereophonic form when the speakers 318 are part of the enhanced user interface devices 324. In some embodiments, the speakers 318 may provide directional or spatial audio output as part of the enhanced user interface devices 324. As described herein, this enhanced audio output functionality of speakers 318 may be unlocked based on a player reaching a progress level in a game of the gaming device 100. Otherwise, the speakers 318 may be configured to provide no sound output, or a basic sound output (e.g., monaural, etc.), if no hardware-unlock option is available for a player based on the player's progress level. In some embodiments, the speakers 318 may provide the spatial or directional audio output to provide a player with "whispered secret hints" during game play, which may only be able to be heard by the actual player (e.g., sitting in the chair 108, etc.), when this particular functionality is activated. A player without the functionality activated would not be able to receive such hints. It is an aspect of the present disclosure that these types of hints may lead to better win conditions and/or probabilities for a player. In some embodiments, the directional and/or spatial audio may be used in a tournament-like scenario where players with the unlocked hardware-unlock options and associated functionality may receive the hints and other players who do not have the unlocked options would not. The joystick 322 may correspond to a directional control stick that pivots at one end and provides a directional input to the gaming device 100. In some embodiments, the directional input may include a magnitude associated with a particular degree of pivot (e.g., angle of pivot, etc.) provided at the joystick 322. In some embodiments, the joystick 322 may be configured as a directional pad, or D-pad, providing discrete buttons/switches for a directional input (e.g., forward, backward, left, right, etc.) based on depressing a single button/switch of the D-pad, and/or combination directional input (e.g., forward-right, forward-left, backward-right, backward-left, etc.) based on depressing two or more buttons/switches of the D-pad.

The enhanced user interface devices 324 may comprise certain display screen devices 326, haptic touch devices 330, payout devices 334, chair devices 338, gaze detection sensors 342, and/or gesture detection sensors 348, etc. One or more of the enhanced user interface devices 324, once unlocked, may activate or enable a functionality beyond that available from the basic user interface devices 304. The enhanced user interface devices 324 may comprise locked devices that are associated with basic user interface devices 304 or separate devices that are separate and apart from the basic user interface devices 304.

In some embodiments, the display screen devices 326 may comprise a 3D parallax filter 352, pressure-sensitive touch sensors 356, and/or other devices integrated with, or attached to various input display screens (e.g., display screens 116A, 116B, touchscreens 310, etc.) of the gaming device 100. Among other things, these display screen devices 326, when unlocked, may enhance a user interface functionality associated with the display screens 116A, 116B and/or the touchscreen(s) 310 of the gaming device 100. For example, the 3D parallax filter 352 may correspond to a substrate (e.g., parallax barrier) that is overlaid on a portion of the display screens 116A, 116B and/or the touchscreen(s) 310. In some embodiments, when a player reaches a certain progress level, a hardware-unlock option may be presented allowing the player to unlock the 3D parallax filter 352 for the display screens 116A, 116B and/or the touchscreen(s) 310. In response to unlocking the 3D parallax filter 352, the processor 204 may align the substrate relative to specific pixels of the display screens 116A, 116B and/or the touchscreen(s) 310, or position the substrate at a distance from the portion of the display screens 116A, 116B and/or the touchscreen(s) 310, such that 2D images rendered by the display screens 116A, 116B and/or the touchscreen(s) 310 are visible in 3D. In one embodiment, this 3D hardware-unlock option may provide a player with a 3D viewing functionality in a game. In some embodiments, display enhancement functionality may be unlocked that allows the display screens 116A, 116B to move from rendering two-dimensional (2D) content to rendering 3D content, visualized, for example, via a 3D video processor. When any 3D viewing functionality is activated, the player may be able to view objects in the game that are disposed behind other objects rendered by the display screens 116A, 116B and/or the touchscreen(s) 310. Among other things, this functionality gives the player a benefit in seeing items, or rewards, that are undetectable to players only using the basic user interface devices 304 of the gaming device 100. Additionally or alternatively, when 3D screen functionality is activated, a player might receive additional information, for example, in a pick feature, about the pick options provided (e.g., in 3D, a player may be able to see information about a volatility of each of the available selections whereas this may not be possible with only 2D screen functionality active).

The pressure-sensitive touch sensors 356 may correspond to one or more strain gauges, load cells, or other sensors associated with the display screens 116A, 116B and/or the touchscreen(s) 310 that detect a pressure applied by a player. Pressure detection may be based on minute changes measured (e.g., via these sensors 356) between a substrate of the display screens 116A, 116B and/or the touchscreen(s) 310 and a reference datum (e.g., back plane, etc.), a change in electrical resistance measured by a strain gauge in contact with a substrate of the display screens 116A, 116B and/or the touchscreen(s) 310, and/or some other deflection of a portion of the display screens 116A, 116B and/or the touchscreen(s) 310 relative to reference point or datum. In some embodiments, when a player reaches a certain progress level, a hardware-unlock option may be presented allowing the player to unlock the pressure-sensitive touch sensors 356 and activate pressure-sensitive input for a game. This pressure-sensitive input may allow a player to vary a strength of an input altering a game behavior or movement of a character in a game. Details of this hardware-unlock option are described in greater detail in conjunction with FIGS. 7A-7B.

Similar to the display screen devices 326 the haptic touch devices 330 may comprise one or more devices that are associated with the display screens 116A, 116B and/or the touchscreen(s) 310 of the gaming device 100. In some embodiments, these haptic touch devices 330 may remain locked until a player reaches a progress level unlocking a hardware-unlock option for the haptic touch devices 330. The haptic touch devices 330, when unlocked, may provide a haptic feedback for a player engaging with a gaming device 100. For instance, a player interacting with one or more display screens 116A, 116B and/or the touchscreen(s) 310 of the gaming device 100, when the touchscreen vibrator 360 is enabled, may be provided with haptic feedback upon contacting certain portions of the display screens 116A, 116B and/or the touchscreen(s) 310. In this example, the touchscreen vibrator 360 may vibrate a portion of the display screens 116A, 116B and/or the touchscreen(s) 310 allowing the player to feel an enhanced interactivity with the display screens 116A, 116B and/or the touchscreen(s) 310. The touchscreen vibrator 360 may correspond to at least one of a haptic vibration motor, a coin vibration motor, linear resonant actuator, eccentric rotating mass vibration motor, and/or other motor that produces an oscillating or vibrating force. In some embodiments, when unlocked, the touchscreen vibrator 360 may provide haptic touch feedback when a player selects a bonus feature, button, hidden bonus, or other feature provided by the display screens 116A, 116B and/or the touchscreen(s) 310. Additionally or alternatively, when the haptic touch feedback is activate, a player may be provided with additional feedback regarding "hot" selections vs. "poor" selections in a feature (e.g. the "hot" selections provide more haptic feedback than poorer selections, etc.). In one embodiment, the player may try to find the best selection corresponding to the most haptic feedback produced (e.g., highest vibration force, longest vibration time, etc.). In some embodiments, the haptic touch devices 330 may comprise an ultrasonic emitter 364 that, when unlocked, produces a mid-air haptic touch feedback response for a player interacting with a gaming device 100. In some embodiments, the ultrasonic emitter 364 may provide intersecting regions of ultrasonic sound emitted in a point in 3D space creating a pressure to player contact. The ultrasonic emitter 364, when unlocked, may provide mid-air haptic functionality for a player of the gaming device 100. The haptic feedback in mid-air functionality may be combined with 3D content displayed on the machine, at the according position.

The payout devices 334 in the enhanced user interface devices 324 may allow a player to unlock a particular type of payout preferred by the player. In some embodiments, the payout devices 334 may correspond to the payout devices 140 described above. The payout devices 334 may include a cash-out device 368 and a ticket issuance device 372. The cash-out device 368 may operate and issue cash, coins, tokens, or chips based on an amount indicated within the credit meter 224 for a player. In some embodiments, the cash-out device 368 may include a coin tray or the like and counting hardware configured to count and distribute an appropriate amount of coins or tokens based on a player's winnings or available credit within the credit meter 224. In one embodiment, the ticket issuance device 372 may be configured to print or provide physical tickets/vouchers to players. In some embodiments, the ticket issuance device 372 may be configured to issue a ticket/voucher consistent with an amount of credit available to a player, possibly as indicated within a credit meter 224 for the player. In some embodiments, a gaming device 100 may, as part of a set of basic user interface devices 304, only update a player's account (e.g., a credit meter 224, etc.) when the player wins a game (e.g., without dispensing coins or issuing tickets, etc.). As part of the enhanced user interface devices 324, when a player reaches a specific progress level, the player may unlock one or more of the payout devices 334 to receive a physical form of payment upon winning. For instance, a player may prefer having coins dispensed into a coin tray when the player wins. In this instance, the player, upon reaching the appropriate progress level for unlocking the payout devices 334, may select to unlock the cash-out device 368. When unlocked, subsequent payouts made by the gaming device 100 may include dispensing coins using the cash-out device 368 of the gaming device 100, allowing the player to enjoy the sound and physical contact associated with a coin payout. After one or more of the payout devices 334 are unlocked, a player may decide to have a ticket payout after a gaming session or a traditional coin payout in order to "remember the good old times of coin payout."

In some embodiments, the enhanced user interface devices 324 may include chair devices 338 that can be unlocked by a player reaching a progress level. The chair devices 338 may include position sensors 376, tilt sensors 380, and chair massagers 384 to name a few. The position sensors 376, when unlocked, may allow movements of the chair 108 to correspond to input for a game of the gaming device 100 (e.g., movement input, directional input, etc.). The position sensors 376 may correspond to strain gauges, switches and/or buttons (e.g., similar to those described in conjunction with the D-pad above) that are interconnected to a seat of the chair 108, a base of the chair 108, and/or some other structure of the chair 108. As a player moves a portion of the chair 108, the movement translates into an actuation of the switches and/or buttons providing the input to the gaming device 100. Additionally or alternatively, the chair 108 may include one or more tilt sensors 380 that are interconnected to the seat, base, and/or some other structure of the chair 108. The tilt sensors 380 may detect rotation of the chair 108 about one or more axes (e.g., the X-axis, the Y-axis, and/or the Z-axis). The tilt sensors 380 may utilize a plurality of strain gauges, switches, and/or buttons (e.g., similar to those described in conjunction with the D-pad above) that interpret force applied to the chair 108 into an input for the gaming device 100. Stated another way, when unlocked, the position sensors 376 and/or the tilt sensors 380 may turn the chair 108 into a controller, or other input device, of the gaming device 100.

In one embodiment, the chair devices 338 may comprise one or more chair massagers 384. The chair massagers 384 may be unlocked based on a player reaching a progress level associated with a game of the gaming device 100. The chair massagers 384 may include, but are in no way limited to, one or more vibration elements (e.g., eccentric rotating mass, etc.), tactile sound transducers, articulating fingers, and/or other mechanism that physically moves a portion of the chair 108. This movement may produce a massage effect to a player sitting in the chair 108. In some embodiments, the chair massagers 384 may include one or more heaters (e.g., resistive heaters, radiant heaters, hot water heaters, etc.) that output heat through a portion of the chair 108 (e.g., to a player sitting in the chair 108). The chair massagers 384 may enable a rumble functionality while the player is playing a game on the gaming device 100. In some embodiments, the chair massagers 384 and rumble functionality may be used to offer the player a massage, once unlocked. In one embodiment, the chair massagers 384 and massage feature may be unlocked based on a progress level of the player (e.g., based on an in-game event, level reached in the game, etc.). A player may want to buy the massage functionality for a certain amount of time. This functionality may be extended by triggering certain "massage extension" events in the game, etc. Additionally or alternatively, various levels and/or types of massage may be unlocked including, but in no way limited to, a seat massage, back massage, or combination seat and back massage. In one embodiment, a player may start by unlocking the seat massage functionality and purchase, or trigger, further types of massages as the player progresses.

The enhanced user interface devices 324 may include one or more gaze detection sensors 342 and gesture detection sensors 348. These sensors 342, 348 may detect movement of a player in proximity to the gaming device 100. The gaze detection sensors 342 may include one or more image sensors 132, camera(s) 136, etc. that detect a movement of a player's eyes and/or head relative to the display screens 116A, 116B, and/or touchscreen(s) 310 of the gaming device 100. When the gaze input functionality is enabled/activated and unlocked, a player may be able to select objects in a bonus feature quicker by simply looking at the objects (e.g., compared to needing to select the object by making physical contact using a hand upon a touchscreen 310, etc.). The gesture detection sensors 348 may include one or more image sensors 132, camera(s) 136, etc. that detect a movement of a player's hands and/or body relative to the cabinet 104, display screens 116A, 116B, and/or touchscreen(s) 310 of the gaming device 100. In one embodiment, the gesture detection sensors 348 may detect movements of a player in an area between the cabinet 104 and the chair 108. Once a player reaches a particular progress level, a player may unlock the gaze detection sensors 342 and/or the gesture detection sensors 348 to provide an additional form of input to a game on the gaming device 100. An example of a gesture input functionality activated by a player unlocking the gesture detection sensors 348 of the gaming device 100 is shown and described in conjunction with FIGS. 6A-6B.

Figure 4:
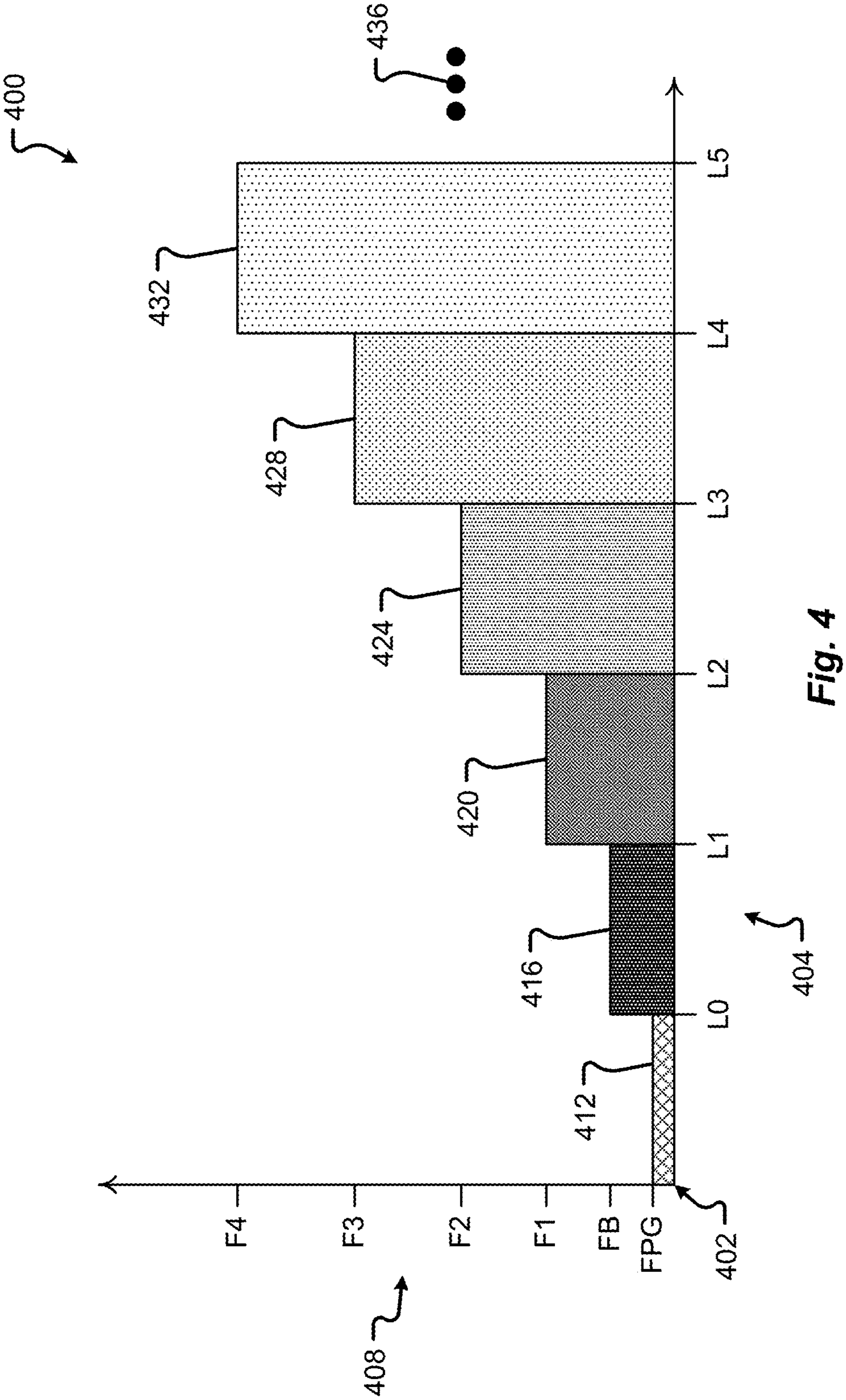
FIG. 4 is an illustrative graph of available hardware-unlock options and associated functionality for a gaming device according to specific progress levels reached by a player.

FIG. 4 is an illustrative graph 400 of available hardware-unlock options and associated functionality for a gaming device 100 according to specific progress levels reached by a player. The hardware-unlock functionality graph 400 shows a progress level axis 404 comprising various progress levels L0-L5 and associated functionality FB, F1-F4 corresponding to each progress level L0-L5 reached by a player. Although shown as unlocking more functionality as the progress level increases, the hardware-unlock options may be limited based on time, game, and/or payment. As described herein, the progress level may correspond to a level reached in a game, an amount of experience points earned in one or more games, a paid-for functionality associated with a game, and/or the like.

The hardware-unlock functionality graph 400 shows a certain number of pre-game functions and hardware 412 before a player plays a game via the gaming device 100. In some embodiments, the gaming device 100 may allow a player to use only a subset of the basic user interface devices 304 before a game is initiated at progress level L0, or the initial progress level. These pre-game functions may include a limited number of button(s) 314, a portion of a touchscreen 310, and/or certain keys of a keyboard 306, etc. In any event, the subset of basic user interface devices 304 may allow a player limited functionality, or interactivity with the gaming device 100, to start a game, navigate menus, or move a cursor on a display screen 116A, 116B of the gaming device 100 (e.g., in selecting options to start a game, etc.). At progress level L0 a player starts playing a game via the gaming device 100. Once the player starts the game, the first user interface functionality 416 may be unlocked to the player. The first user interface functionality 416 may include the functionality associated with the basic user interface devices 304 of the gaming device 100. The basic user interface devices 304 may be available to a player while playing a game on the gaming device 100.

Once a player reaches the first progress level L1, a second user interface functionality 420 may be activated. For instance, once the player reaches the first progress level L1, the player may be presented with a hardware-unlock option to unlock one or more devices of the user interface hardware 216. More specifically, the hardware-unlock option may define one or more user interface devices of the enhanced user interface devices 324 available to unlock. In one embodiment, the hardware-unlock option associated with a particular device in the enhanced user interface devices 324 may be automatically selected (e.g., by the processor 204 executing the hardware-unlock instruction set 228 and/or the game instruction set 220). In some embodiments, the hardware-unlock option associated with a particular device in the enhanced user interface devices 324 may be selected by a player upon reaching the progress level. Unlocking hardware at the first progress level L1 may activate the second user interface functionality 420 for the player. The second user interface functionality 420 may allow a player to provide alternative input to the gaming device 100 (e.g., apart from the input associated with the basic user interface devices 304) or interact with the gaming device 100 in a manner that is enhanced when compared to the input and interaction available to the player prior to reaching the first progress level L1.

As the player continues to reach subsequent progress levels L2-L4, and beyond, additional hardware-unlock options may be presented to the player allowing additional functionality F2-F4, and beyond, to be activated. For example, at progress level L2, a third user interface functionality 424 can be activated by selecting one or more of the enhanced user interface devices 324 for unlocking that were previously unavailable (e.g., prior to reaching progress level L2). Continuing the example, at progress level L3, a fourth user interface functionality 428 can be activated by selecting one or more of the enhanced user interface devices 324 for unlocking that were previously unavailable (e.g., prior to reaching progress level L3). At progress level L4, a fifth user interface functionality 432 can be activated by selecting one or more of the enhanced user interface devices 324 for unlocking that were previously unavailable (e.g., prior to reaching progress level L4), and so on. As the player continues to reach additional progress levels, additional user interface functionality 436 may be unlocked and/or activated.

Figure 5A:
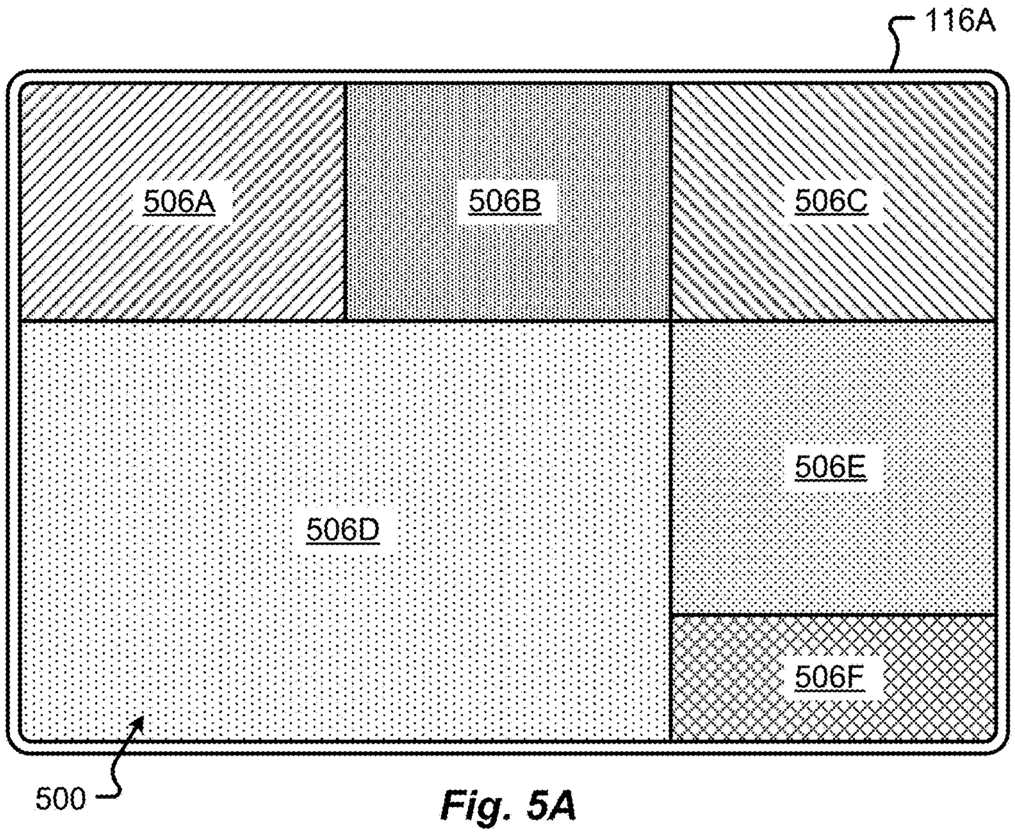
FIG. 5A is a schematic diagram of a screen of a gaming device in a segmented presentation for rendering information to a player.
Figure 5B:
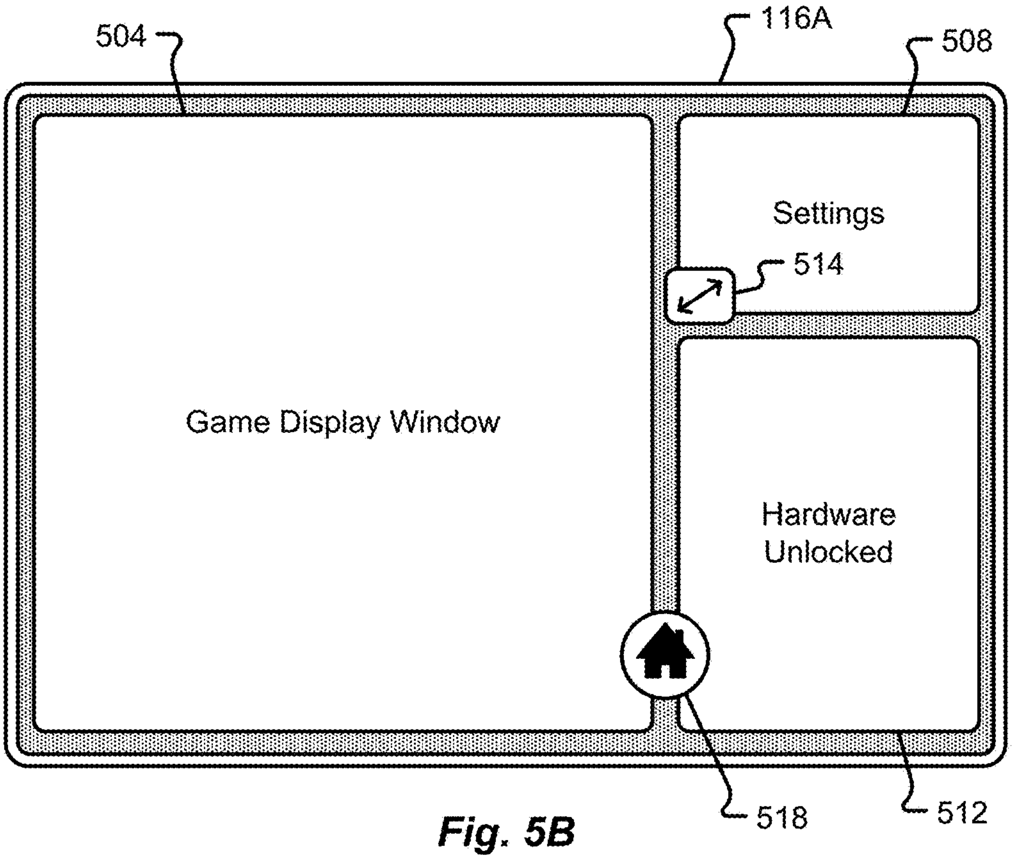
FIG. 5B is a representative image of a screen of a gaming device comprising an arrangement of windows with one window displaying game information and other windows displaying settings and hardware unlock information for the gaming device.

With reference now to FIGS. 5A-5B, representative images of a first display screen 116A of a gaming device 100 exhibiting various composite presentations are shown in accordance with at least some embodiments of the present disclosure. The gaming device 100 may render any casino game, arcade game, player information, and/or settings the display area 500 of the first display screen 116A. In some embodiments, the first display screen 116A may include a background configured to display a background image. The display area 500 may be separated into two or more display portions 506A-506F, or areas. Although shown as including six different portions 506A-506F, it should be appreciated that the display area 500 may include greater or fewer portions, in similar or different proportions and/or sizes, than illustrated in FIG. 5A. In addition, one or more windows, display elements, or interactive features may cross over one or more of the portions 506A-506F illustrated in FIG. 5A. Stated another way, a window may at least partially fill a single portion 506A-506F of the display area 500 or an area defined by multiple portions 506A-506F of the display area 500. By way of example, the game display window 504 shown in FIG. 5B may substantially fill an area of the display area 500 defined by the first portion 506A, the second portion 506B, and the fourth portion 506D, together, while the settings window 508 is shown as substantially filling the third portion 506C of the display area 500. Continuing with the example presentation shown in FIG. 5B, the hardware unlocked window 512 may substantially fill an area of the display area 500 defined by the fifth portion 506E and the sixth portion 506F together.

The display device 238 may be configured to render, via the game instruction set 220 and/or the hardware-unlock instruction set 228, a game display window 504, a settings window 508, and/or a hardware unlocked window 512. Additionally or alternatively, the display device 238 may be configured to render one or more other windows to the display area 500. As provided above, the display area 500 of the first display screen 116A may be divided into separate, or discrete, areas or screen portions 506A-506F. It is an aspect of the present disclosure that the position of these areas may be moved, resized, minimized, superimposed, created, and/or removed, based at least part on player input and progress level reached. In one embodiment, a game may be rendered to the game display window 504 (e.g., provided by the game instruction set 220 executed by the processor 204, etc.). The game display window 504 may provide an area for a player to play a game associated with the gaming device 100. The settings window 508 may provide a settings interface for a player to adjust settings of a game, unlock user interface hardware 216 and associated functionality, and/or manage preferences of the player. The hardware unlocked window 512 may allow a player to quickly identify unlocked hardware, remaining time on activated functionality, and/or render options to extend a hardware unlock and associated functionality, etc.

In addition to the separate windows 504, 508, 512, the display area 500 may include interface elements that manipulate or alter a size and/or position of the windows and/or a navigation between applications running on the gaming device 100. For example, the display area 500 may include one or more window manipulation buttons 514. As shown in FIG. 5B, the window manipulation button 514 is illustrated in a corner of the settings window 508. Although shown in this location, it should be appreciated that the window manipulation button 514 may be rendered to any portion or combination of portions of the display area 500. In some embodiments, the window manipulation button 514 may cause a particular window to expand, contract, move, or otherwise resize. Additionally or alternatively, the window manipulation button 514 may cause one window to swap positions with another window rendered to the display area 500. For instance, as shown in FIG. 5B, a player may select the window manipulation button 514 to swap the game display window 504 with the settings window 508 such that the content associated with the settings window 508 is moved and resized (e.g., expanded) to be shown in the first portion 506A, second portion 506B, and fourth portion 506D of the display area 500 together (e.g., taking the place of the game display window 504). In this example, the content of the game display window 504 may move and resize (e.g., shrink) into the third portion 506C (e.g., taking the place of the settings window 508). In some embodiments, the display area 500 includes a navigation button 518 shown spanning over a portion of the game display window 504 and the hardware unlocked window 512. Although shown in this location, it should be appreciated that the navigation button 518 may be rendered to any portion or combination of portions of the display area 500. The navigation button 518 may provide a player with the ability to navigate between applications, close windows, move windows off screen, and/or otherwise move among programs running on the gaming device 100.

Figure 5C:
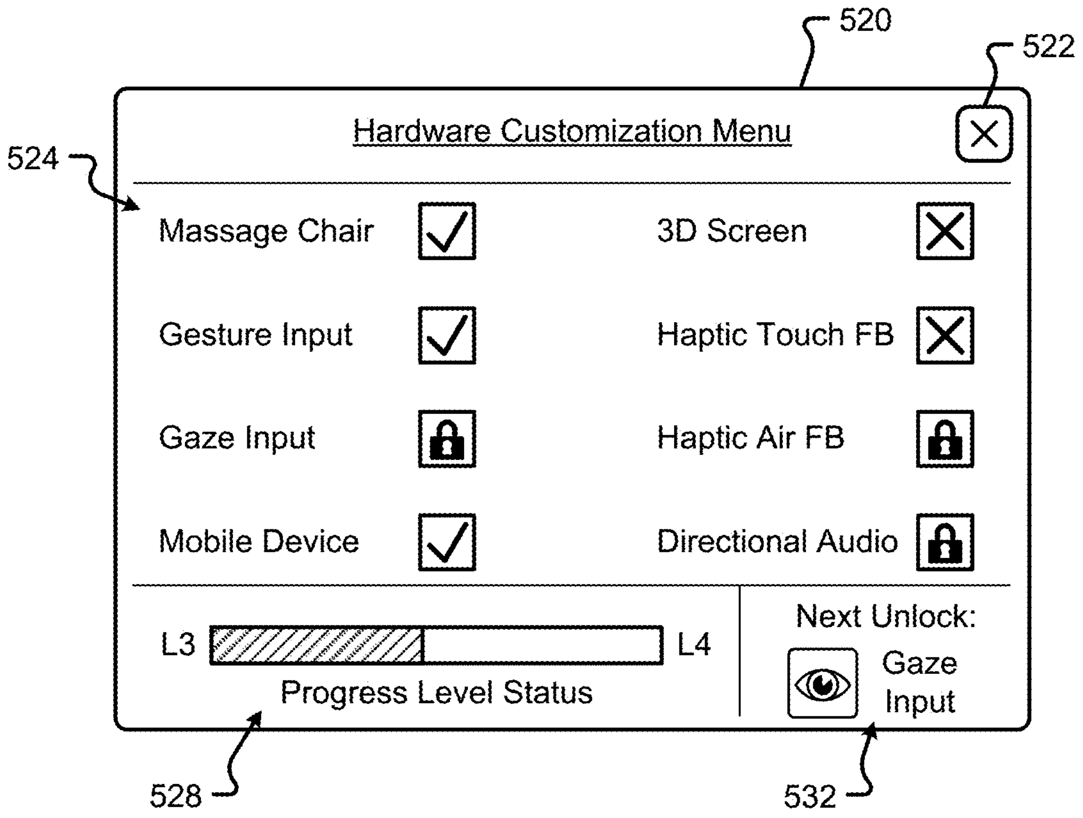
FIG. 5C illustrates a hardware customization window providing a plurality of player-selectable options to activate hardware-unlockable functionality at a progress level of a player.
Figure 5D:
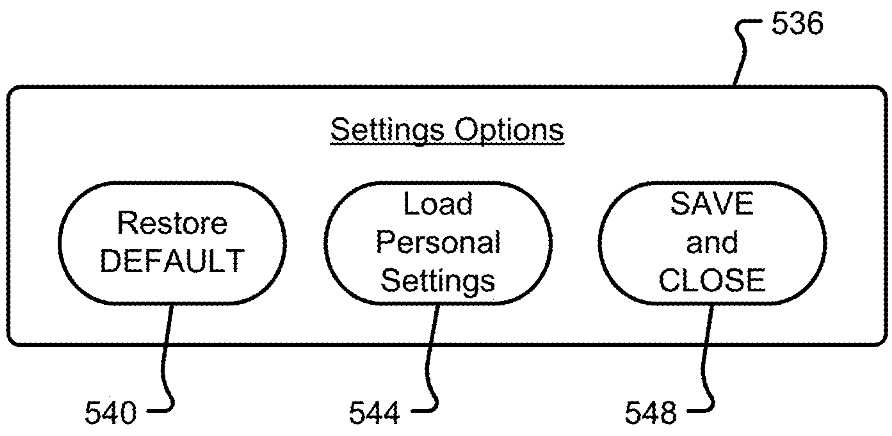
FIG. 5D illustrates a settings options window providing a plurality of player-selectable options to activate, load, and save hardware-unlockable functionality for a gaming device.
Figure 5E:
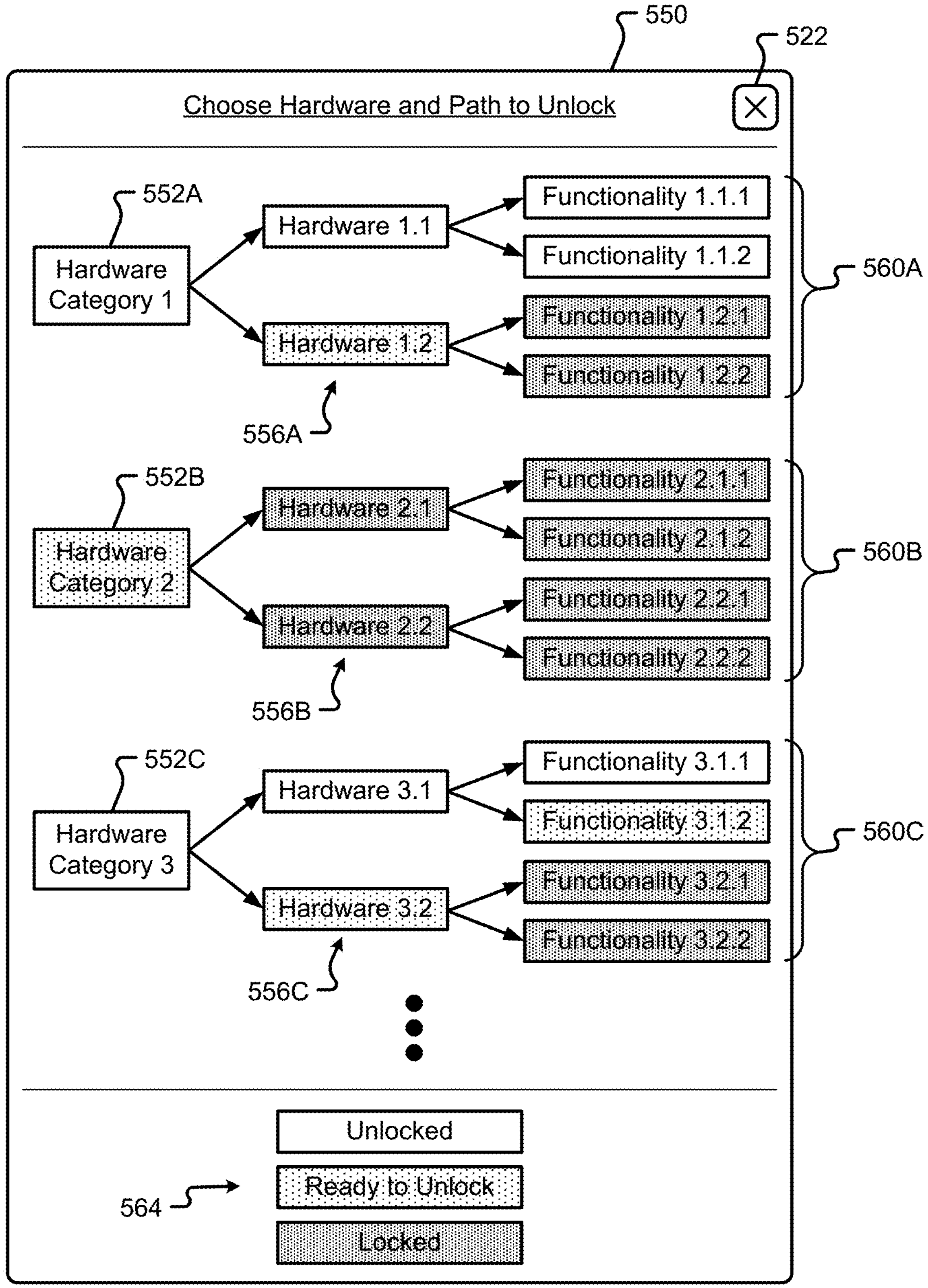
FIG. 5E illustrates a hardware-unlock map window showing specific functionality of a gaming device that is unlocked, ready to unlock, and locked by respective hardware-unlock paths.

Referring to FIGS. 5C-5E, various windows 520, 536, 550 that may be rendered to one or more of the windows 504, 508, 512 and/or screen portions 506A-506F of the display area 500 are shown in accordance with embodiments of the present disclosure. The windows 520, 536, 550 may be configured as pop-up windows, menus, full-screen presentations, partial-screen presentations, etc., and/or combinations thereof, that are rendered by the display device 238 (e.g., the display screens 116A, 116B, the touchscreen(s) 310, etc.).

FIG. 5C illustrates a hardware customization window 520 rendered by the display device 238 of the gaming device 100. The hardware customization window 520 provides a hardware selection area 524 comprising options for a player to select hardware-unlockable functionality based on a progress level reached by the player. The hardware customization window 520 may include one or more window manipulation buttons 522. As shown in the top right-hand corner of the hardware customization window 520, the window manipulation button 522 may provide a button that, when selected, by a player closes the hardware customization window 520.

The hardware selection area 524 may include player-selectable options describing a functionality associated with various hardware-unlock options that can be activated by player selection. These player-selectable options may include functionality associated with one or more of the enhanced user interface devices 324 of the user interface hardware 216. For instance, the player-selectable options comprise a massage chair option (e.g., unlocking the chair massagers 384 of the chair devices 338, etc.), a gesture input option (e.g., unlocking the gesture detection sensors 348 of the enhanced user interface devices 324), a gaze input option (e.g., that, when available, unlocks the gaze detection sensors 342 of the enhanced user interface devices 324), a mobile device option (e.g., unlocking a mobile device for engaging with the gaming device 100), a 3D screen option (e.g., that, when selected, unlocks the 3D parallax filter 352 of the display screen devices 326), a haptic touch feedback option (e.g., that, when selected, unlocks the touchscreen vibrator 360 of the haptic touch devices 330), a haptic air feedback option (e.g., that, when available, unlocks the ultrasonic emitter 364 of the haptic touch devices 330), and a directional audio option (e.g., that, when available, unlocks a directional audio output capability of the speakers 318). As illustrated in FIG. 5C, the massage chair option, the gesture input option, and the mobile device option are shown as selected (e.g., by the "check mark" in the associated selection box) unlocking the respective user interface hardware 216 and activating the functionality associated therewith. The 3D screen option and the haptic touch feedback options are available to the player, but are shown as deselected (e.g., by the "X" in the associated selection box). The gaze input option, the haptic air feedback option, and the directional audio option are shown as locked, or unavailable, (e.g., by the "lock" symbol in the associated selection box) to the player at the player's current progress level.

The hardware customization window 520 may include a progress level status area 528 that identifies the player's current progress level reached and, in some cases, a progress status to a next progress level for the player. As shown in the progress level status area 528, the player has reached the third progress level L3, and is about halfway to reaching the fourth progress level L4. At the fourth progress level, the next hardware-unlock option for the player becomes available.

In some embodiments, the hardware customization window 520 may include a next unlock area 532 that previews at least one hardware-unlock option and associated functionality that is available at the next progress level for the player. As shown in the next unlock area 532 in FIG. 5C, the next hardware-unlock option available to the player upon reaching the fourth is associated with the gaze input option. In one embodiment, this next unlock area 532 may encourage a player to keep playing a game to reach the next progress level, especially when the player is close to reaching the next progress level as shown in the progress level status area 528. In some embodiments, the progress level status area 528 and/or the next unlock area 532 may provide the player with information requirements before the next unlock becomes available (e.g., a message stating "play X number of games to unlock enhanced gesture functionality" etc.). These requirements may be time-based (e.g., playing for a certain amount of additional time, etc.), game-based (e.g., reaching a next level in a game to unlock, or playing a certain number of games to unlock, etc.), payment-based (e.g., paying a certain amount to unlock a specific feature/functionality, etc.), and/or combinations thereof.

As illustrated in FIG. 5C, the hardware customization window 520 includes a number of player-selectable options that a player can individually configure (e.g., select/deselect, enable/disable, etc.) hardware-unlock options as preferred. In some embodiments, after unlocking a first level of functionality associated with a particular piece of hardware (e.g., gesture sensor, etc.), not all features may be enabled immediately (e.g., two hand gestures, etc.). This progressive unlocking capability may keep a player curious with further available functionalities of the same hardware. Moreover, unlocking a first level of functionality associated with a particular hardware device may assist the player in becoming familiar and comfortable with the newly unlocked hardware without overwhelming the player with a number of options and functions the player does not yet understand.

FIG. 5D illustrates a settings options window 536 providing a plurality of player-selectable options to activate, load, and save hardware-unlockable functionality for a gaming device 100. The settings options window 536 may comprise one or more options related to the hardware-unlock options, selections made by a player at the hardware customization window 520, and/or the progress level of a player. For instance, the settings options window 536 may comprise a restore default settings button 540, a load personal settings button 544, and a save and close button 548, to name a few. The status of personally configured hardware-unlock options and associated functionality may be saved on the current gaming device 100. For example, a player may make the selections in the hardware customization window 520 and then select the save and close button 548 of the settings options window 536 to save the customized options selected by the player. In some embodiments, the personally configured hardware-unlock options and associated functionality may be discarded after a particular gaming session has ended. In one embodiment, a player may wish to restore the default setting associated with a gaming device 100. The default settings may correspond to the functionality provided only by the basic user interface devices 304 and not by the enhanced user interface devices 324. In this case, the player may select the restore default settings button 540 to deactivate the functionality of any enhanced user interface devices 324 unlocked. Additionally or alternatively, the personally configured hardware-unlock options and associated functionality may be saved to a player's loyalty account (e.g., tracking card, biometrics, login data, etc.). In one embodiment, after saving, it might be possible to restore the personally configured hardware-unlock options and associated functionality at the same or another compatible gaming device 100 after enabling the loyalty account at the gaming device 100. For instance, a player may select the load personal settings button 544 via the settings options window 536 to load the personally configured hardware-unlock options and associated functionality previously saved. As can be appreciated, this ability allows a player's personal progress of unlocking and configuring hardware-unlock options and associated functionality to be restored whenever the player intends to do so. The settings may include, but are in no way limited to, configuration settings (e.g., saved settings, identification of unlocked hardware, unlocked functionality, etc.), progress level status (e.g., progress levels reached, requirements to reach next progress level, etc.), an amount of time remaining for unlocked hardware and associated functionality, and/or other information associated with the player and hardware-unlock options.

FIG. 5E illustrates a hardware-unlock map window 550 showing specific functionalities of a gaming device 100 that are unlocked, ready to unlock, and/or locked by a player selecting respective hardware-unlock paths. Similar to the hardware customization window 520, the hardware-unlock map window 550 may include a window manipulation button 522 that controls some aspect of the hardware-unlock map window 550 (e.g., minimizing the window 550, maximizing the window 550, closing the window 550, moving the window 550, etc.). In some embodiments, the hardware-unlock map window 550 may show one or more hardware categories 552A-552C that lead to respective specific hardware subcategories 556A-556C. The hardware categories 552A-552C may define sets of user interface hardware 216 included in the enhanced user interface devices 324. For instance, the hardware categories 552A-552C may correspond to the display screen devices 326, haptic touch devices 330, payout devices 334, the chair devices 338, and/or other devices categories in the enhanced user interface devices 324. As illustrated in FIG. 5E, each hardware path (e.g., running from a particular category in the hardware categories 552A-552C through linked hardware subcategories 556A-556C, etc.) corresponds to one or more associated functionalities hardware functionalities 560A-560C.

The hardware subcategories 556A-556C may correspond to the individual hardware devices in each of the hardware categories 552A-552C. For example, the first hardware category 552A may correspond to the haptic touch devices 330 and the first hardware subcategory 556A may be divided into "Hardware 1.1" representing the touchscreen vibrator 360 and "Hardware 1.2" representing the ultrasonic emitter 364. Continuing this example, the first hardware functionality 560A may be subdivided into various functionalities (e.g., 1.1.1, 1.1.2, 1.2.1, and 1.2.2, etc.) that represent functionalities that can be activated by unlocking the associated hardware in the first hardware subcategories 556A. One example of a first functionality (e.g., 1.1.1) that is associated with the touchscreen vibrator 360 may include a vibration feature upon providing a selection input. This functionality may be enabled separately from the second functionality (e.g., 1.1.2). The second functionality associated with the touchscreen vibrator 360 may correspond to a vibration feature that is used to detect a hidden bonus on a touchscreen 310 of the gaming device 100. In this case, when a player runs a finger across the touchscreen 310, the touchscreen vibrator 360 may vibrate providing an indication to the player that a hidden bonus is available in the spot in which the player's finger triggered the vibration.

The hardware path unlock legend 564 may provide an indication of which hardware path, or portion thereof, is unlocked, ready to unlock, and/or locked. As provided above, some paths, or portions of paths, may be unlocked while others remain locked. For instance, the third hardware category 552C is shown unlocked, and the "Hardware 3.1" associated with the third hardware subcategories 556C is shown unlocked. However, only the first functionality (e.g., 3.1.1) of the third hardware functionality 560C is shown as activated or unlocked while the second functionality (e.g., 3.1.2) of the third hardware functionality 560C is shown as inactive but ready to unlock. Until the second functionality is unlocked, the second functionality cannot be activated for the player.

The second hardware category 552B is shown as ready to unlock but the associated second hardware subcategories 556B and second hardware functionality 560B are shown as locked or inactive. Until the second hardware category 552B is unlocked, the second hardware subcategories 556B will remain locked and, as such, the associated functionality (e.g., the second hardware functionality 560B) will remain inactive and unavailable to the player.

The hardware-unlock map window 550 graphically represents that, after reaching "the next level," (e.g., progress level, etc.) players may be able to select their preferred hardware-unlock options and associated functionalities to be unlocked. As outlined in the hardware-unlock map window 550, based on a particular "unlock path," a player can select the next level in a category 552A-552C and/or subcategory 556A-556C they have already unlocked. In some embodiments, when a player wants to select a next level, all previous levels may need to be already unlocked.

Figure 6B:
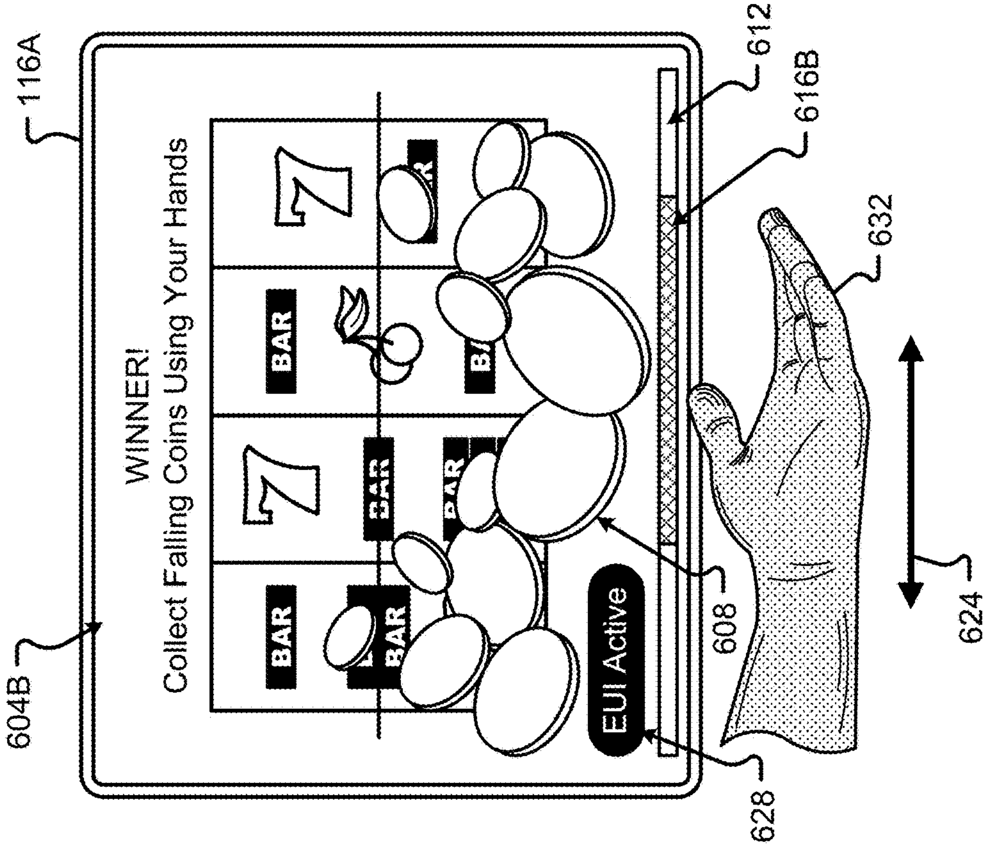
FIG. 6B is a representative image of a screen of a gaming device comprising a payout window and virtual coin collection interface using an enhanced user interface with gesture detection functionality activated via a hardware-unlock option.
Figure 6A:
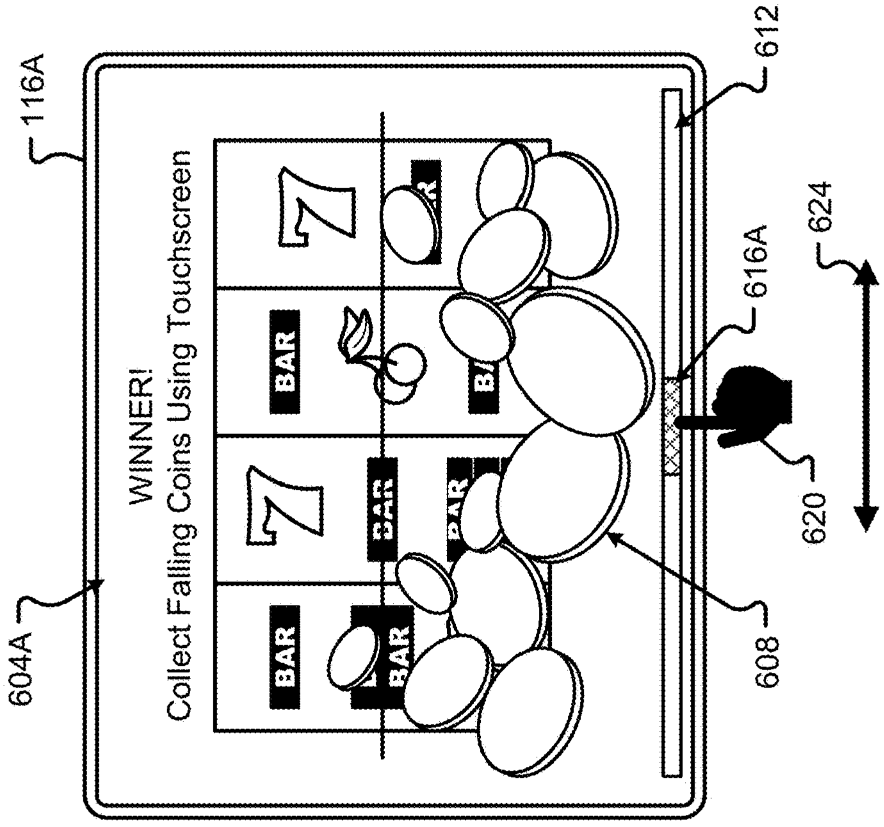
FIG. 6A is a representative image of a screen of a gaming device comprising a payout window and virtual coin collection interface using a basic user interface with the screen.

Referring now to FIGS. 6A-6B, different user interface devices of a game providing different gaming experiences are shown in accordance with embodiments of the present disclosure. Specifically, FIGS. 6A-6B show the difference between interacting with a game using a basic user interface device 304 (e.g., FIG. 6A) and interacting with the same game using an enhanced user interface device 324 (in FIG. 6B).

FIG. 6A is a representative image of a first display screen 116A of a gaming device comprising a first payout window 604A and virtual coin collection interface using a basic user interface (e.g., basic coin collection slider bar 616A) with the screen 116A. As provided above, the first display screen 116A may be a touchscreen 310 or other type of display device 238. In FIG. 6A, as a player wins a game, the game instructs the player to "collect falling coins using the touchscreen." The touchscreen may require a player to contact a basic coin collection slider bar 616A using a finger, stylus, or other slider bar control device 620. By moving the basic coin collection slider bar 616A along a length of the coin collection slider travel area 612 (e.g., in a slider bar movement direction 624 left-to-right, right-to-left, etc.), the width of the basic coin collection slider bar 616A may be positioned under the falling virtual coins 608 to collect the payout. In some embodiments, this type of interactive collection is referred to as a "coin flight." The objective of the "coin flight" is for a player to collect as many coins as possible using the basic coin collection slider bar 616A.

In the coin collection illustration of FIG. 6A, collecting coins by sliding a basic coin collection slider bar 616A across a first display screen 116A may provide a limited width of the coin collector (e.g., the bar 616A) and a slow movement response time.

FIG. 6B is a representative image of a first display screen 116A of a gaming device comprising a second payout window 604B and virtual coin collection interface using an enhanced user interface (e.g., enhanced coin collection slider bar 616B) with gesture detection functionality activated via a particular hardware-unlock option (e.g., gesture input provided by unlocking the gesture detection sensors 348 of the gaming device 100). In FIG. 6B, the use of hand 632 gestures (e.g., holding the hand flat in front of the first display screen 116A, and without needing to touch the first display screen 116A, etc.) to collect the virtual coins 608 may be considered beneficial when compared to touching the touchscreen with a finger at a certain position to catch coins falling across this position, as illustrated in FIG. 6A. With the enhanced coin collection slider bar 616B and gesture input active in FIG. 6B, the game may instruct the player to "collect falling coins using your hands." In some embodiments, the second payout window 604B may include an enhanced user interface indicator 628 that informs the player that the gesture input functionality is active. Based on the size of the hands, the width of the enhanced coin collection slider bar 616B may be increased compared to the width of the basic coin collection slider bar 616A. As the player moves their hand 632 in the slider bar movement direction 624 in front of the first display screen 116A, the enhanced coin collection slider bar 616B may mimic the movement and move along the length of the coin collection slider travel area 612 collecting the virtual coins 608 as they fall. In the coin collection illustration of FIG. 6B, collecting coins by a player moving their hand 632 in front of a first display screen 116A may provide an increased width of the enhanced coin collection slider bar 616B, a faster movement response time, and/or a more enjoyable experience.

Figure 7B:
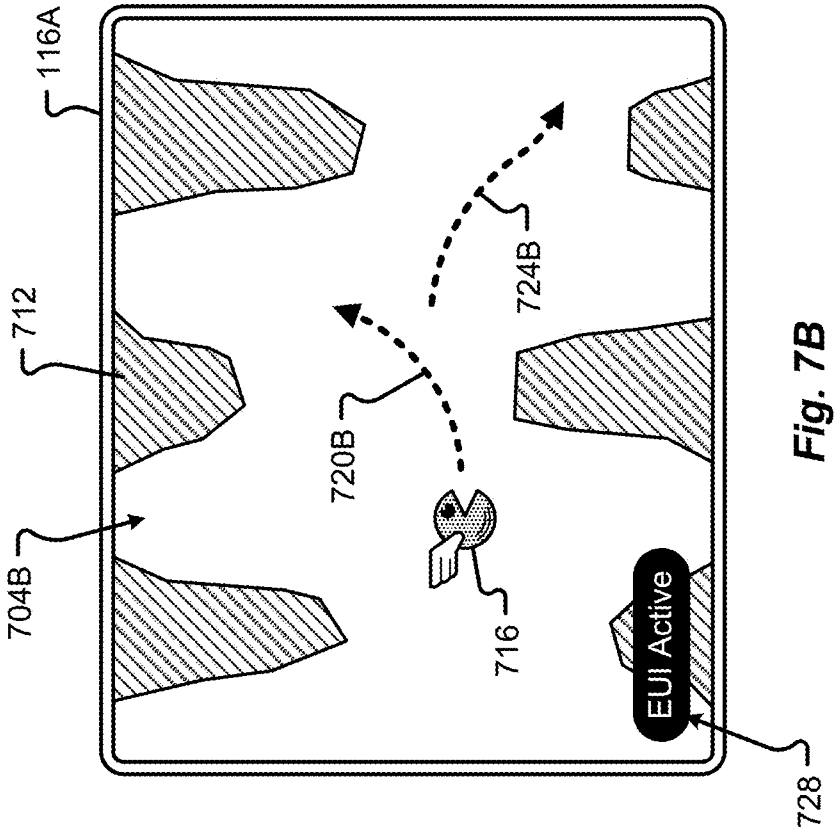
FIG. 7B is a representative image of a screen of a gaming device comprising a scrolling-game and character movement using an enhanced user interface with pressure-sensitive functionality activated via a hardware-unlock option.
Figure 7A:
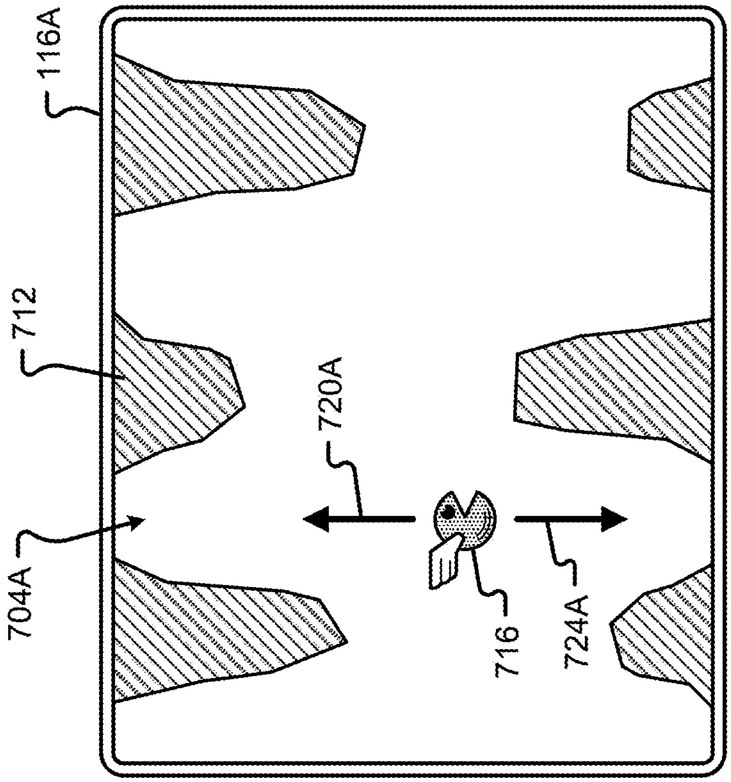
FIG. 7A is a representative image of a screen of a gaming device comprising a scrolling-game and character movement using a basic user interface with the screen.

FIGS. 7A-7B show the difference between a game behavior based on receiving a basic user interface device player input (in FIG. 7A) and an enhanced user interface device player input (in FIG. 7B). The game shown rendered to the first display screen 116A of FIGS. 7A-7B may correspond to a 2D scrolling game where a player must navigate a game character 716 (e.g., a flying creature character, etc.) along a path avoiding a series of rendered objects 712 (e.g., stalactites, stalagmites, etc., in a cave). For the sake of simplicity, FIGS. 7A-7B will be described where the background (e.g., including the rendered objects 712) moves from the right-hand side of the first display screen 116A to the left-hand side of the first display screen 116A. Input provided by a player may move the game character 716 up or down as the background scrolls in accordance with a particular input device described.

In FIG. 7A, the first scrolling-game window 704A includes a game character 716 moving along a path between rendered objects 712 scrolling past the game character 716. To move the game character 716 in the first scrolling-game window 704A, a player may provide a basic first movement input 720A and a basic second movement input 724A. In one embodiment, the basic first movement input 720A may correspond to a player touching a touchscreen 310 of the gaming device 100. The touchscreen 310 may be part of the first display screen 116A or separate from the first display screen 116A. While the player is touching the touchscreen 310, this basic first movement input 720A moves the game character 716 upward, or rise (e.g., toward the stalactites in the cave). When the player releases touching the touchscreen 310, this basic second movement input 724A causes the game character 716 to move downward, or fall (e.g., toward the stalagmites in the cave). In FIG. 7A, the amount of time that a player touches the touchscreen is the only way the player can control the corresponding movement of the game character 716.

FIG. 7B represents a second scrolling-game window 704B of the game described above, where the user has unlocked the pressure-sensitive touch sensors 356 of the touchscreen 310 and associated input functionality by reaching a particular progress level. An enhanced user interface indicator 728 rendered to the first display screen 116A may inform the player that the pressure-sensitive input functionality is active. To move the game character 716 in the second scrolling-game window 704B, a player may provide an enhanced first movement input 720B and an enhanced second movement input 724B enabled by the unlocked pressure-sensitive touch sensors 356. In one embodiment, the enhanced movement inputs 720B, 724B may allow a player to provide pressure-based control of the game character 716.

For example, the enhanced first movement input 720B provided by the player may be a "hard touch," a "soft touch," and/or a "medium touch" input. The "hard touch" may correspond to an input provided by the player by exerting a touch force on the touchscreen 310 above a predetermined high-force threshold value, which is detected by the pressure-sensitive touch sensors 356 as a "fast rise" game character 716 movement. In response to detecting the "hard touch" enhanced first movement input 720B, the game instruction set 220, when executed by the processor 204, may cause the game character 716 rendered to the first display screen 116A to rise at a first rate of speed. The "soft touch" may correspond to an input provided by the player by exerting a touch force on the touchscreen 310 below a predetermined low-force threshold value, which is detected by the pressure-sensitive touch sensors 356 as a "slow rise" game character 716 movement. In response to detecting the "soft touch" enhanced first movement input 720B, the game instruction set 220, when executed by the processor 204, may cause the game character 716 rendered to the first display screen 116A to rise at a second rate of speed lower than the first rate of speed. The "medium touch" may correspond to an input provided by the player by exerting a touch force on the touchscreen 310 below the predetermined high-force threshold value and above the low-force threshold value, which is detected by the pressure-sensitive touch sensors 356 as a "medium rise" game character 716 movement. In response to detecting the "medium touch" enhanced first movement input 720B, the game instruction set 220, when executed by the processor 204, may cause the game character 716 rendered to the first display screen 116A to rise at a third rate of speed lower than the first rate of speed and higher than the second rate of speed.

Similar to the enhanced first movement input 720B, the enhanced second movement input 724B provided by the player may be a "hard release," a "soft release," and/or a "medium release" input. The "hard release" may correspond to an input provided by the player by quickly removing a touch force applied to the touchscreen 310 at a rate of speed above a predetermined hard-release threshold rate, which is detected by the pressure-sensitive touch sensors 356 as a "fast fall" game character 716 movement. In response to detecting the "hard release" enhanced second movement input 724B, the game instruction set 220, when executed by the processor 204, may cause the game character 716 rendered to the first display screen 116A to fall at a first rate of speed (e.g., fall quickly). The "soft release" may correspond to an input provided by the player slowly, or gradually, removing a touch force applied to the touchscreen 310 at a rate of speed below a predetermined slow-release threshold rate, which is detected by the pressure-sensitive touch sensors 356 as a "slow fall" game character 716 movement. In response to detecting the "soft release" enhanced second movement input 724B, the game instruction set 220, when executed by the processor 204, may cause the game character 716 rendered to the first display screen 116A to fall at a second rate of speed below the first rate of speed (e.g., fall slowly). The "medium release" may correspond to an input provided by the player by removing a touch force applied to the touchscreen 310 at a rate of speed below the predetermined hard-release threshold rate and above the soft-release threshold rate, which is detected by the pressure-sensitive touch sensors 356 as a "medium fall" game character 716 movement. In response to detecting the "medium release" enhanced second movement input 724B, the game instruction set 220, when executed by the processor 204, may cause the game character 716 rendered to the first display screen 116A to fall at a third rate of speed below the first rate of speed and faster than the second rate of speed.

As can be appreciated, this pressure-based input functionality associated with the player unlocking the pressure-sensitive touch sensors 356 of the touchscreen 310 by reaching a particular progress level, allows the player greater control of the game character 716 movement (e.g., as the game character 716 avoids colliding with the rendered objects 712). The pressure-sensitive touch input, where the pressure-sensitive touch sensors 356 detect the amount of pressure applied to the touchscreen 310, may be used as an enhancement to any touchscreen 310 interface input (e.g., to gain better control and further input functionality from the touchscreen 310, etc.). For example, in the game described above (e.g., where the player must try to navigate the flying creature along a path in a cave without hitting the stalactites and stalagmites, etc.) a standard touchscreen 310 input (e.g., simply touching and releasing the screen, etc.) may only provide a "touch signal ON" or "touch signal OFF" (e.g., causing the flying creature to rise or to fall). On the other hand, when the pressure-sensitive touch input is unlocked by the player, the player gains greater control over the flying creature by being able to control the flying creature more accurately (e.g., a hard touch producing a quick rise of the flying creature, and a soft touch producing a slow rise of the flying creature, etc.).

Figure 8:
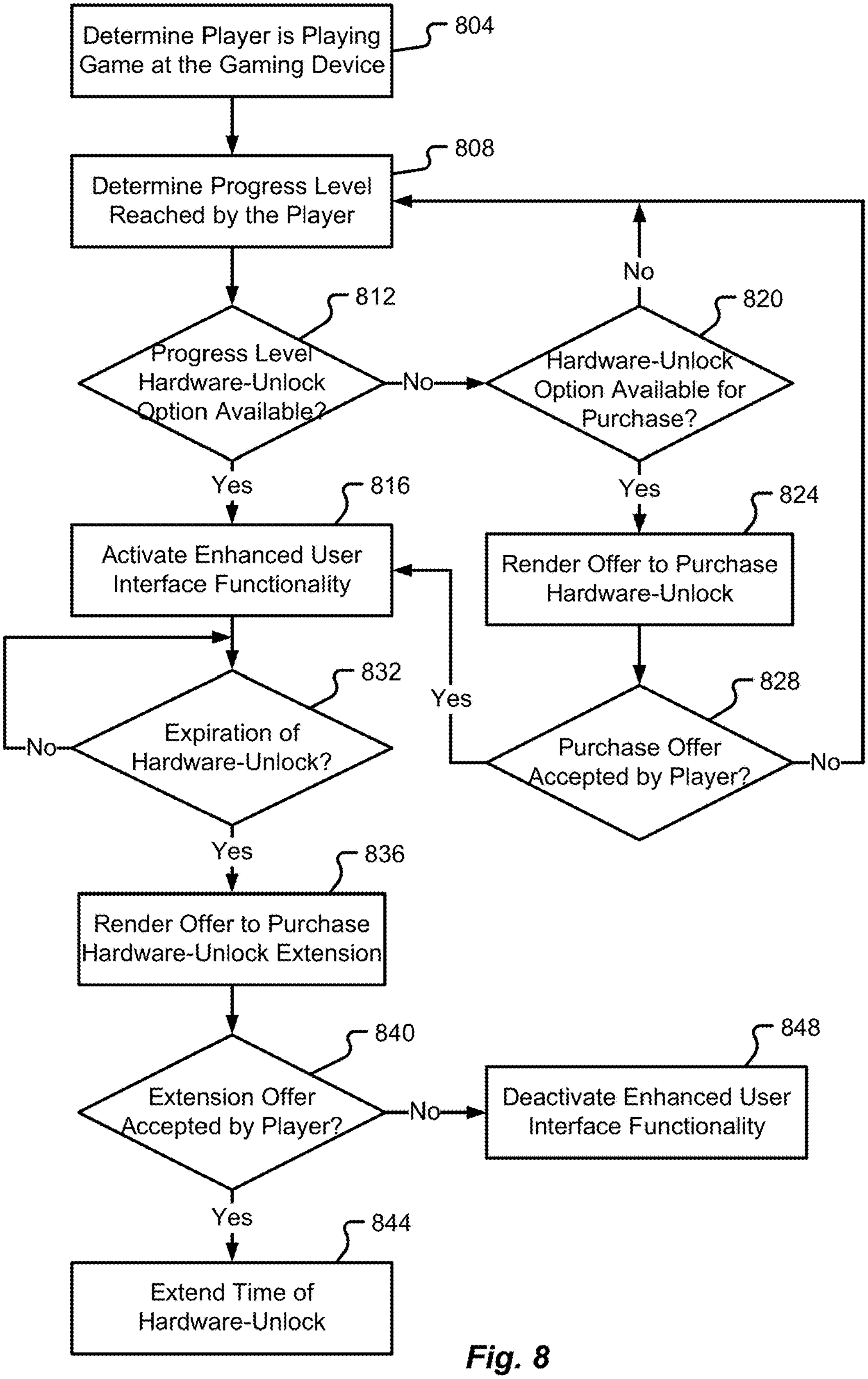
FIG. 8 is a flow diagram of an example process for activating enhanced functionality of a gaming device based on a hardware-unlock option that is available to a player.

Referring now to FIG. 8, a flow diagram is shown of an example process for activating enhanced functionality of a gaming device 100 based on a hardware-unlock option that is available to a player. The methods described herein may be run as a set of instructions on a gaming device 100 and/or a server that manages the behavior and/or operation of the gaming devices 100. In some embodiments, the set of instructions may be part of an application installed on the gaming device 100 and/or the server that manages the behavior and/or operation of the gaming devices 100. The method may begin by determining that a player is playing a game at the gaming device 100 (step 804). When a player is playing a game via a gaming device 100, the player may accumulate experience points associated with the game, reach progress levels associated with the game and/or gaming device 100, and otherwise win rewards for playing the game. In some embodiments, a player, prior to playing a game, may interact with the gaming device 100 using a set of pre-game interface devices. This interaction may only be limited to navigation functions, game-selection, and/or game-initiation functions. Prior to playing the game, the player is not awarded any points, cannot unlock hardware-unlock options associated with the gaming device 100, and cannot reach progress levels associated with the game or the gaming device 100. In one embodiment, determining that a player is playing a game may include determining the player has selected and/or paid for a game at the gaming device 100. Additionally or alternatively, a player may be determined to be playing when the player is identified at the gaming device 100 (e.g., via the camera(s) 136, image sensors 132, etc.) and/or has initiated a game at the gaming device 100.

The method proceeds by determining a progress level reached by the player (step 808). As described herein, the progress level may correspond to one or more of a level reached in a game, an amount of experience points earned by a player (e.g., by playing a certain number of games, meeting a certain number of criteria, accomplishing a certain number of tasks, etc.), an amount of time a player has played a particular game, gaming device 100, and/or number of games, a paid-for functionality associated with a game and/or a device, a triggered in-game event, etc. In some embodiments, the progress level associated with in-game events and player progress may be considered separately from paid-for progress levels (e.g., paid-for functionality, etc.). For instance, the gaming device 100 may reward players who earn progress levels by playing games and gaining experience points differently than players who pay for progress levels. By way of example, a player who has only paid for hardware-unlock options, and who has not reached any in-game progress level, may only be allowed to follow a limited unlock path where certain hardware functionality 560A-560C remains locked to the player. The certain hardware functionality 560A-560C may remain locked to the player until the player gains experience points, plays a certain number of games, or reaches higher progress levels.

Next, the method continues by determining whether a hardware-unlock option is available for the determined progress level of the player (step 812). Various progress levels, when reached, may provide one or more specific hardware-unlock options to a player. For instance, at a first progress level a first hardware-unlock option may become available to a player. The first hardware-unlock option, when selected, may allow the player to unlock a first enhanced user interface device 324 and activate an available selected functionality associated with the first enhanced user interface device 324. In some embodiments, the hardware-unlock instruction set 228 may include the rules associated with which hardware-unlock options are available to a player at a particular progress level. Once at least one hardware-unlock option is determined to be available to a player, the option may be automatically selected and/or an option may be rendered to the display device 238 to allow a player to select the hardware-unlock option.

In the event that no hardware-unlock option is available to the player based on the progress level reached by the player, the method may optionally continue by determining whether any hardware-unlock option is available for purchase by the player (step 820). If not, the method may return to step 808. However, if a paid-for hardware-unlock option is available, the method may proceed by rendering an offer to the display device 238 for the player to purchase the available paid-for hardware-unlock option (step 824). The offer may be rendered as a pop-up window to at least a portion of the display device 238. The method may comprise determining whether the purchase offer is accepted by the player (step 828). For instance, the pop-up window may include one or more user-selectable options that, among other things, allow the player to accept or deny the purchase offer. When the player selects the "accept" option, the method may decrement a credit value from the credit meter 224 associated with the player and proceed to step 816. In the event that the player selects the "deny" option, the method may return to step 808.

Once a hardware-unlock option is selected or purchased, the method may continue by unlocking the selected hardware (e.g., the enhanced user interface device 324) and activating the functionality associated with the selected enhanced user interface device 324 (step 816). Unlocking the selected hardware may include activating a chosen functionality for the unlocked hardware (e.g., via interacting with a hardware customization window 520, etc.). Once unlocked, the functionality may be activated for a limited amount of time, a limited number of games, for a gaming session while at the gaming device 100, for a limited purpose (e.g., during a bonus game, etc.), and/or permanently (e.g., having no expiration).

The method may proceed by determining whether the hardware-unlock has expired or is about to expire (step 832). In some embodiments, this expiration may be based on a timer (e.g., a countdown timer, a count-up timer, etc.), completing a game or a number of games to which the functionality was tied, and/or the end of a gaming session at the gaming device 100. When the hardware-unlock has not expired, is not about to expire, or is permanent in nature, the method may return to determine a subsequent progress level reached by the player at step 808. In some embodiments, the method may wait until the hardware-unlock expires or is about to expire (e.g., when the hardware-unlock is not permanent).

In some embodiments, a player may be presented with an offer to purchase an extension of the hardware-unlock option that is about to expire or has expired (step 836). Similar to the purchase offer rendered in step 824, the offer to extend a hardware-unlock may be rendered as a pop-up window to at least a portion of the display device 238. The offer may include a cost to extend the hardware-unlock and a time associated with the extension.

The method may continue by determining whether the offer to extend the hardware-unlock is accepted by the player (step 840). This determination may comprise detecting whether the player has selected one of a plurality of user-selectable options associated with the pop-up window that identifies whether the player accepted or denied the extension offer. In the event that the player selects an "accept" option (e.g., accepting the offer to extend the hardware-unlock), the method may decrement a credit value from the credit meter 224 associated with the player and proceed to step 844 where the hardware-unlock is extended for a defined amount of time, a certain number of games, for a gaming session, and/or permanently.

In the event that the player selects a "deny" option (e.g., denying the offer to extend the hardware-unlock), the method may proceed to step 848 where the hardware-unlock is allowed to completely expire and the associated functionality is deactivated for the player. After steps 844 or 848, and as long as the player is still playing a game at the gaming device 100, the method may continue by returning to step 808 and determining subsequent progress levels reached by the player.

Figure 9:
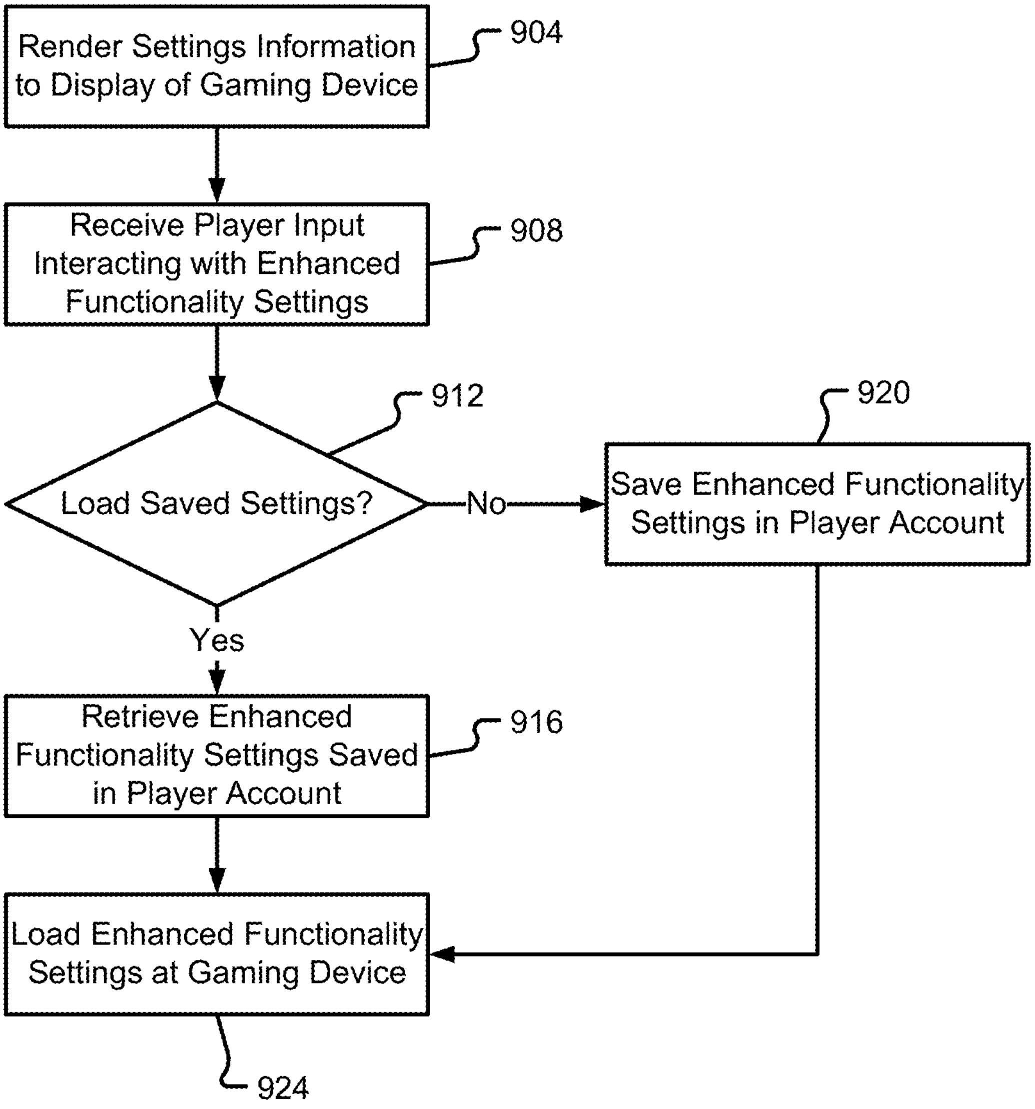
FIG. 9 is a flow diagram of an example process for configuring, saving, and loading enhanced functionality settings associated with a player of a gaming device.

FIG. 9 is a flow diagram of an example process for configuring, saving, and transferring enhanced functionality settings associated with a player of a gaming device 100. The methods described in conjunction with FIG. 9 may be run as a set of instructions on a gaming device 100 and/or a server that manages the behavior and/or operation of one or more gaming devices 100. In some embodiments, the set of instructions may be part of an application installed on the gaming device 100 and/or the server that manages the behavior and/or operation of the gaming devices 100. The method of FIG. 9 may describe a process that follows one or more of the steps (e.g., step 812) described in conjunction with the method of FIG. 8. Additionally or alternatively, the method of FIG. 9, may begin in response to receiving an input from a player selecting an option, icon, or other rendered portion of a settings window 508, a hardware customization window 520, a settings options window 536, and/or a hardware-unlock map window 550, etc. The method begins by rendering the hardware customization window 520, the settings options window 536, and/or other interactive elements to a display device 238 of the gaming device 100 (step 904).

Next, the method continues by receiving input from a player interacting with one or more enhanced functionality settings displayed by the display device 238 (step 908). These settings may comprise information about the player's configuration settings (e.g., saved settings, identification of unlocked hardware, unlocked functionality, etc.), progress level status (e.g., progress levels reached, requirements to reach next progress level, etc.), an amount of time remaining for unlocked hardware and associated functionality, and/or other information associated with the player and hardware-unlock options. The input may include the player making selections of hardware-unlock options, settings options, and/or other enhanced functionality settings rendered to the hardware customization window 520, the settings options window 536, and/or the hardware-unlock map window 550. The input received may be associated with hardware-unlock option configuration selections made by the player. In one embodiment, the method may determine whether a player has selected an option that loads or restores saved settings associated with the player (step 912). This player-selectable option may be presented as the load personal settings button 544 described in conjunction with FIG. 5D.

If selected, the method may proceed by retrieving enhanced functionality settings saved in a player account associated with the player (step 916). The enhanced functionality settings may be saved to a player account that is stored on the gaming device 100, in a server separate from the gaming device 100, in a mobile device associated with the player, on a game or tracking card, and/or combinations thereof. Retrieving the saved settings may include the gaming device 100 accessing information stored on a game card of the player, accessing information stored in a player profile database, in a computer readable medium or memory 208 of the gaming device 100, or other memory location in a computer readable medium associated with a server that is separate from the gaming device 100, etc. The information accessed may be part of a player account associated with the player. Retrieving the saved settings, among other things, allows the enhanced functionality settings to be transferred from one gaming device 100 to another gaming device 100 in a gaming venue (e.g., a casino, etc.). Additionally or alternatively, retrieving the enhanced functionality settings allows a player to restore their personal settings, progress, and hardware unlock options for another gaming session (e.g., a new gaming session, etc.) at any compatible gaming device 100.

In the event that the player selects an option to save settings at step 908, the method may proceed to save the enhanced functionality settings in a player account (step 920). As provided above, the player account may correspond to a data structure stored in a player profile database or some other memory location of a computer readable medium. The computer readable medium may be a part of the gaming device 100, a game card, a player tracking card, a mobile device of the player, a server, and/or combinations thereof.

The method continues by loading saved enhanced functionality settings at a gaming device 100 (step 924). The enhanced functionality settings may be automatically loaded by the gaming device 100 determining that saved enhanced functionality settings exist for a player (e.g., in a player account or other memory location). In one embodiment, loading the enhanced functionality settings may include, but is in no way limited to, unlocking hardware of the gaming device 100, activating an enhanced functionality associated with hardware of the gaming device 100, and/or providing at least one feature to the player that was previously unavailable to the player (e.g., prior to loading the enhanced functionality settings, etc.). In some cases, the hardware-unlock instructions 228, when executed by the processor 204 and based on the saved enhanced functionality settings, may switch at least one of the selective enhanced user interface devices 316 and enhanced user interface devices 324 and/or an associated functionality of the user interface hardware 216 from a locked state to an unlocked state, or vice versa.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, an arcade game, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, “EGM” as used herein represents one EGM or a plurality of EGMs, “personal gaming device” as used herein represents one personal gaming device or a plurality of personal gaming devices, and “central server, central controller, or remote host” as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such “thin client” embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such “thick client” embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming device, comprising:

interface hardware comprising a basic user interface device available to a player while playing a game and an enhanced user interface device that is unavailable to the player while playing the game until unlocked;

a processor coupled to the interface hardware; and a memory coupled with and readable by the processor and storing therein instructions that, when executed by the processor, cause the processor to:

determine a progress level reached by the player while playing the game using the basic user interface device;

determine, based on the progress level reached, that a hardware-unlock option is available for the player while playing the game; and activate, based on determining that the hardware-unlock option is available, the enhanced user interface device unlocking a functionality associated with the enhanced user interface device that is absent from the basic user interface device;

wherein the enhanced user interface is activated in response to the player interacting with the gaming device to accept an offer to activate the enhanced user interface, the offer to activate the enhanced user interface device comprising a plurality of player-selectable options rendered by a display device of the gaming device identifying different types of the enhanced user interface device available to unlock, and wherein an input received from the player interacting with the gaming device accepting the offer identifies a particular type of the enhanced user interface device to unlock from the plurality of player-selectable options rendered.

2. The gaming device of claim 1, wherein the functionality associated with the enhanced user interface device increases chances associated with the player winning the game.

3. The gaming device of claim 1, wherein the enhanced user interface device corresponds to at least one of a gesture controller, a gaze controller, a haptic touch feedback device, a pressure-sensitive input device, and a chair-integrated massager.

4. The gaming device of claim 1, wherein the instructions further cause the processor to:

determine a subsequent progress level reached by the player while playing the game on the gaming device using the enhanced user interface device;

determine, based on the subsequent progress level reached, that a subsequent hardware-unlock option is available for the player while playing the game; and activate, based on determining that the subsequent hardware-unlock option is available, a different enhanced user interface device unlocking a functionality associated with the different enhanced user interface device that is absent from the basic user interface device and the enhanced user interface device prior to reaching the subsequent progress level.

5. The gaming device of claim 1, wherein determining that the hardware-unlock option is available for the player comprises instructions that further cause the processor to:

determine that the progress level has reached a predetermined experience level associated with the game; and determine, based on the predetermined experience level, a type of the enhanced user interface device available for unlocking.

6. The gaming device of claim 5, wherein the predetermined experience level corresponds to at least one of an amount of time the player has been playing the game, a number of games played by the player, and a number of experience points collected by the player while playing the game.

7. The gaming device of claim 1, wherein the instructions further cause the processor to:

deactivate, after a predetermined condition occurs, the enhanced user interface device locking the functionality associated with the enhanced user interface device, wherein the predetermined condition comprises at least one of a time limit and a number of games played while the enhanced user interface device is activated.

8. The gaming device of claim 7, wherein prior to the predetermined condition occurring the instructions further cause the processor to:

render, by the display device, a player-selectable option to prevent deactivation of the enhanced user interface device for an extended period of time; and receive a payment input from the player interacting with the gaming device selecting the player-selectable option to prevent deactivation of the enhanced user interface device for the extended period of time.

9. A method, comprising:

determining, by a processor of a gaming device, that a player is using a basic user interface device while playing a game on the gaming device;

determining, by the processor, a progress level reached by the player while playing the game on the gaming device;

determining, by the processor based on the progress level reached, that a hardware-unlock option is available for the player while playing the game on the gaming device; and activating, by the processor based on determining that the hardware-unlock option is available, an enhanced user interface device previously unavailable to the player prior to reaching the progress level unlocking a functionality associated with the enhanced user interface device that is absent from the basic user interface device;

wherein the enhanced user interface is activated in response to the player interacting with the gaming device to accept an offer to activate the enhanced user interface, the offer to activate the enhanced user interface device comprising a plurality of player-selectable options rendered by a touchscreen of the gaming device identifying different types of the enhanced user interface device available to unlock, and wherein an input received from the player interacting with the gaming device accepting the offer identifies a particular type of the enhanced user interface device to unlock from the plurality of player-selectable options rendered.

10. The method of claim 9, wherein the functionality associated with the enhanced user interface device increases chances associated with the player winning the game.

11. The method of claim 9, wherein the enhanced user interface device corresponds to at least one of a gesture controller, a gaze controller, a haptic touch feedback device, a pressure-sensitive input device, and a chair-integrated massager.

12. The method of claim 9, further comprising:

determining, by the processor, a subsequent progress level reached by the player while playing the game on the gaming device using the enhanced user interface device;

determining, by the processor based on the subsequent progress level reached, that a subsequent hardware-unlock option is available for the player while playing the game on the gaming device; and activating, by the processor based on determining that the subsequent hardware-unlock option is available, a different enhanced user interface device unlocking a functionality associated with the different enhanced user interface device that is absent from the basic user interface device and the enhanced user interface device prior to reaching the subsequent progress level.

13. The method of claim 9, wherein determining that the hardware-unlock option is available for the player further comprises:

determining, by the processor, that the progress level has reached a predetermined experience level associated with the game; and determining, by the processor based on the predetermined experience level, a type of the enhanced user interface device available for unlocking, wherein the predetermined experience level corresponds to at least one of an amount of time the player has been playing the game on the gaming device, a number of games played by the player on the gaming device, and a number of experience points collected by the player while playing the game on the gaming device.

14. The method of claim 9, further comprising:

deactivating, by the processor after a predetermined condition occurs, the enhanced user interface device locking the functionality associated with the enhanced user interface device, wherein the predetermined condition comprises at least one of a time limit and a number of games played while the enhanced user interface device is activated.

15. The method of claim 14, wherein prior to the predetermined condition occurring the method comprises:

rendering, by the touchscreen, a player-selectable option to prevent deactivation of the enhanced user interface device for an extended period of time; and receiving, via the touchscreen, a payment input from the player interacting with the gaming device selecting the player-selectable option to prevent deactivation of the enhanced user interface device for the extended period of time.

16. A gaming machine, comprising:

a first user interface device available to a player while playing a game on the gaming machine;

a second user interface device that is unavailable to the player until a first gaming progress level is reached by the player playing the game on the gaming machine;

a third user interface device that is unavailable to the player until a second gaming progress level is reached by the player playing the game on the gaming machine;

a display device;

a processor coupled to the first user interface device, the second user interface device, the third user interface device, and the display device; and a memory coupled with and readable by the processor and storing therein instructions that, when executed by the processor, cause the processor to:

determine, when the first gaming progress level is reached by the player playing the game on the gaming machine, that the second user interface device is available to unlock;

render, by the display device in response to determining that the second user interface device is available to unlock, a first player-selectable option to activate the second user interface device;

receive a first input from the player selecting the first player-selectable option;

activate, based on the first input received from the player, the second user interface device unlocking a functionality associated with the second user interface device that is absent from the first user interface device;

determine, when the second gaming progress level is reached by the player playing the game on the gaming machine, that the third user interface device is available to unlock;

render, by the display device in response to determining that the third user interface device is available to unlock, a second player-selectable option to activate the third user interface device;

receive a second input from the player selecting the second player-selectable option; and activate, based on the second input received from the player, the third user interface device unlocking a functionality associated with the third user interface device that is absent from the first user interface device and the second user interface device;

wherein at least two of the first user interface device, the second user interface device, and the third user interface device comprise at least two different ones of a gesture controller, a gaze controller, a haptic touch feedback device, a pressure-sensitive input device, and a chair-integrated massager.

* * * * *